US006314986B1

(12) United States Patent
Zheng et al.

(10) Patent No.: US 6,314,986 B1
(45) Date of Patent: Nov. 13, 2001

(54) GAS CONTROL DEVICE AND METHOD OF SUPPLYING GAS

(75) Inventors: Dao-Hong Zheng, Manor Park; John Irven, High Wycombe, both of (GB); Mark Allen George, Santa Rosa, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/189,562

(22) Filed: Nov. 11, 1998

(30) Foreign Application Priority Data

Nov. 14, 1997 (GB) ........................................ 9724168

(51) Int. Cl.[7] .......................... B08B 9/027; F16K 11/10; F16K 51/00; F17D 1/04

(52) U.S. Cl. .......................... 137/240; 137/597; 137/884; 134/98.1; 134/99.1; 134/166 C

(58) Field of Search .......................... 137/15.01, 15.04, 137/15.05, 240, 597, 884, 861; 134/94.1, 98.1, 99.1, 166 R, 166 C, 171

(56) References Cited

U.S. PATENT DOCUMENTS 4,169,486 * 10/1979 Otteman et al. .................... 137/240
4,383,547 * 5/1983 Lorenz et al. ...................... 137/240

(List continued on next page.)

FOREIGN PATENT DOCUMENTS

459966A2 12/1991 (EP) ................................ F16K/1/30
0588531 3/1994 (EP) ................................ F16K/1/30

(List continued on next page.)

OTHER PUBLICATIONS

UK Patent Office Search Report dated Jun. 23, 1998 for priority application GB 9724168.1.

(List continued on next page.)

*Primary Examiner*—George L. Walton
(74) *Attorney, Agent, or Firm*—McAndrews, Held & Malloy, Ltd.

(57) ABSTRACT

A modular gas control device for use with a compressed gas cylinder (111) comprises a primary module (152) and a secondary module (252) mounted on the primary module. The primary module comprises a first supporting body (154) having a first main gas flow path (155) through the body. The supporting body has input connecting means (156) for mounting the body on the cylinder (111) and connecting the gas flow path (155) to communicate with the gas cylinder through a first flow path (157). Pressure reducing means (166) provides gas in the flow path at a lower pressure than in the container. Output connecting means (170) downstream of the pressure reducing means provides a low pressure outlet from the main gas flow path. A high pressure shut off valve (164) is positioned upstream of the pressure reducing means, and filling means (161, 160) allows filling of the cylinder with compressed gas through the input connecting means (156) along a second flow path (159) separate from the input flow path (157). The secondary module (252) has a corresponding supporting body (254) and main flow path (255) and corresponding output connecting means (270) and corresponding input connecting means (256) for mounting the secondary module (252) on the primary module (152). The supporting body (254) of the secondary module has a combination of two or more functional components comprising means for measuring and/or varying parameters of gas flow in the second supporting body, and/or for switching and/or venting and/or mixing gas flow in the second supporting body.

35 Claims, 18 Drawing Sheets

U.S. PATENT DOCUMENTS

| | | | | |
|---|---|---|---|---|
| 4,554,942 | * | 11/1985 | Williams et al. | 137/240 |
| 4,869,301 | * | 9/1989 | Ohmi et al. | 137/240 |
| 4,917,136 | * | 4/1990 | Ohmi et al. | 137/240 |
| 5,033,499 | | 7/1991 | Patel et al. | 137/269 |
| 5,086,807 | | 2/1992 | Lasnier et al. | 137/505.11 |
| 5,127,436 | | 7/1992 | Campion et al. | 137/614.11 |
| 5,137,047 | * | 8/1992 | George | 137/240 |
| 5,163,475 | | 11/1992 | Gregoire | 137/597 |
| 5,409,526 | | 4/1995 | Zheng et al. | 96/132 |
| 5,440,477 | | 8/1995 | Rohrberg et al. | 364/188 |
| 5,566,713 | | 10/1996 | Lhomer et al. | 137/613 |
| 5,605,179 | | 2/1997 | Strong et al. | 137/884 |
| 5,678,602 | | 10/1997 | Cannet et al. | 137/505.25 |
| 5,727,589 | * | 3/1998 | Yokogi | 137/240 |
| 5,749,389 | * | 5/1998 | Ritrosi et al. | 137/240 |
| 6,012,478 | * | 1/2000 | Park | 137/240 |

FOREIGN PATENT DOCUMENTS

| | | | |
|---|---|---|---|
| 588531A1 | 3/1994 | (EP) | F16K/1/30 |
| 0688983 | 12/1995 | (EP) | F16K/1/30 |
| 275242A2 | 1/1987 | (EP) | F17C/13/04 |
| 308875A2 | 3/1989 | (EP) | G05D/16/10 |
| 747796A1 | 12/1996 | (EP) | G05D/16/10 |
| 03219172 | 9/1991 | (JP) | F16K/1/30 |
| 05039898 | 2/1993 | (JP) | F17C/13/00 |
| 05215299 | 2/1993 | (JP) | F17C/13/00 |
| 9629529 | 9/1996 | (WO) | F16K/11/10 |
| 9607843 | 3/1996 | (WO) | F16K/3/08 |

OTHER PUBLICATIONS

Fourth UK Patent Office Search Report dated Oct. 14, 1998

Second UK Patent Office Search Report dated Oct. 14, 1998 for priority application GB 9724168.1.

Third UK Patent Office Search Report dated Oct. 14, 1998 for priority application GB 9724168.1.for priority application GB 9724168.1.

"A Revolutionary Actuator For Microstructures" in Sensors, Feb. 1993 by Helmers Microsystems, Inc.

"Benefits of a Minimalist Gas System Design" by Phillips and Sheriff, in Solid State Technology, Oct. 1996.

"The Next Step in Process Gas Delivery: A Fully Integrated System" by Cestari, Laureta and Itafugi, in Semiconductor International, Jan. 1997.

* cited by examiner

FIG. 11a.
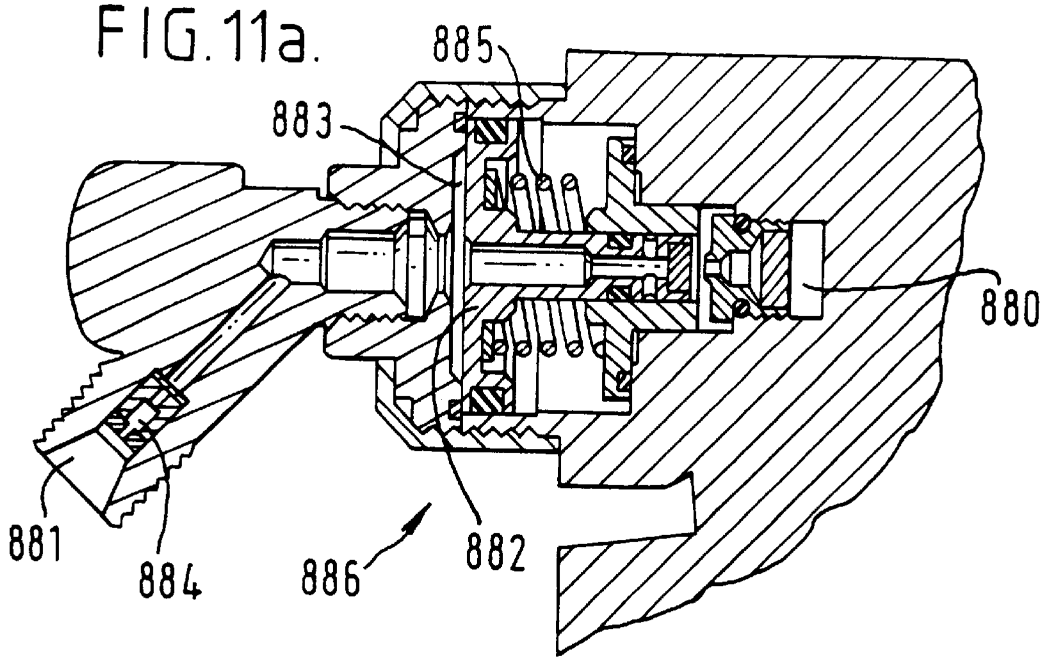
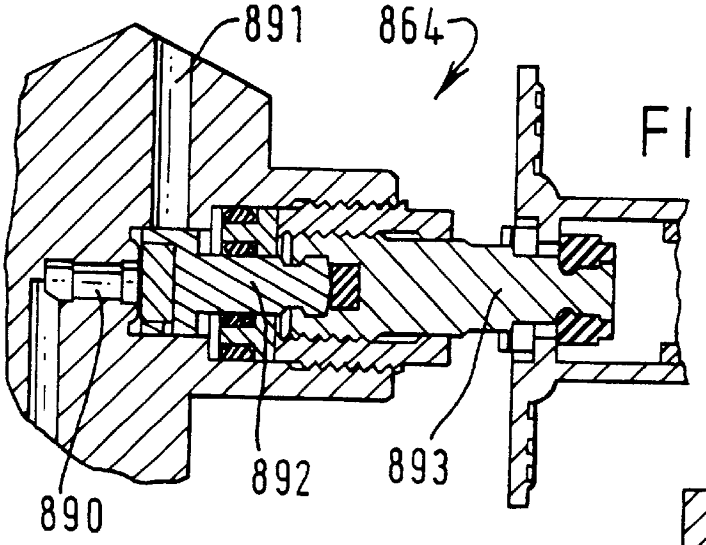
FIG. 11b.
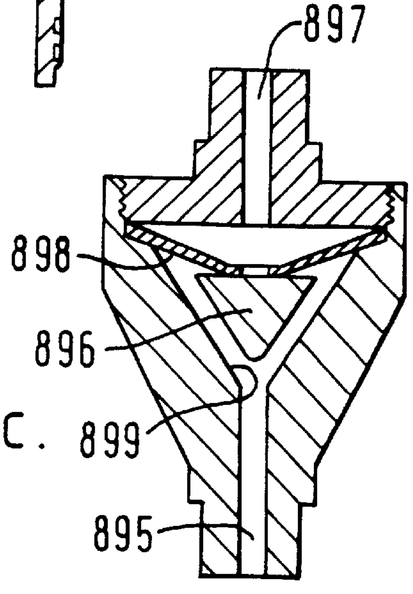
FIG. 11c.

GAS CONTROL DEVICE AND METHOD OF SUPPLYING GAS

The present invention relates to a gas control device for use with a container of compressed gas, and to a method of supplying gas from such a container.

The term gas encompasses both a permanent gas and a vapor of a liquefied gas. Permanent gases are gases which cannot be liquefied by pressure alone, and for example can be supplied in cylinders at pressures up to 300 bar g. Examples are argon and nitrogen. Vapors of liquefied gases are present above the liquid in a compressed gas cylinder. Gases which liquefy under pressure as they are compressed for filling into a cylinder are not permanent gases and are more accurately described as liquefied gases under pressure or as vapors of liquefied gases. As an example, nitrous oxide is supplied in a cylinder in liquid form, with an equilibrium vapor pressure of 44.4 bar g at 15° C. Such vapors are not permanent or true gases as they are liquefiable by pressure or temperature around ambient conditions.

The conventional approach to handling gas from high pressure cylinders is to use a number of discrete components fitted to the outside of the cylinder to control such functions as pressure, flow, gas shut-off, and safety relief. Such arrangements are complex and bring problems of leaks, dead space, and numerous joints, giving difficulty in product quality and purity. Often the assembly must be enclosed in a gas cabinet which may need to be large and therefore expensive.

Compressed gas cylinders are used in a wide range of markets. In the low cost general industrial market, current standard cylinder valves are very cheap, but there is a requirement for additional functions to be built into the valve to give customers added benefits, such as direct pressure control and flow control in medical applications. In the higher cost end, such as electronics, there is a need to eliminate the problems associated with corrosion, contamination, and human exposure when making and breaking connections to the gas container, when using high purity corrosive, toxic and pyrophoric electronic speciality gases.

An example of these difficulties arises in the refilling procedure for a gas cylinder. Normally cylinders contain high pressure gases which are usually controlled by a simple shut-off cylinder valve (with a built-in rupture disc in the USA). Usually the gas will be used at a pressure substantially lower than that in the container, and the user will connect in the circuit a pressure reducing means such as an expansion valve. When there is a need to refill the gas cylinder, the shut-off valve on the cylinder is closed and the high pressure circuit is disconnected. This make and break at the high pressure of the cylinder gives the possibility of leakage and contamination. Attempts have been made to overcome this by refilling without making the high pressure disconnection.

In EP-A-0 275 242 (AGA AKTIEBOLAG) published on Jul. 20th, 1988, there is disclosed an integrated cylinder valve control device intended for use primarily in gas therapy and intended to be permanently connected to a gas cylinder and surrounded by a protective cup fixedly mounted to the cylinder. The valve has a valve housing with a connection socket for the gas cylinder, and a residual gas valve and a non-return valve. The control device further includes a regulator disposed in the valve housing and operative to reduce the cylinder pressure to suitable working pressure, a shut off valve for the gas, a quick coupling device for connection of a consumption conduit, a device for connection of a gas replenishment conduit to the cylinder, and a device for indicating the gas content in the cylinder.

In EP-A-0308875 (Union Carbide Corporation) published on Mar. 29th, 1989 there is disclosed a valve-regulator assembly for rendering a high pressure gas source compatible with lower pressure equipment, the valve regulator being sealable or remote from the high pressure gas source enabling recharging at high pressure. In one embodiment, a single outlet is used for a low pressure outlet, after pressure has been reduced by a regulator, and the same outlet is used with an adaptor to recharge the cylinder. When the adaptor is used, closure means on the adaptor plug moves the regulator to a fixed position sealing off gas flow from the main conduit without regard to the gas pressure otherwise acting on the regulator. Recharging of the cylinder then takes place through the adaptor. This enables complete shut-off of high pressure gas before recharging, so as to avoid make and break at high pressure.

A similar device is disclosed in U.S. Pat. No. 5,033,499 (Patel et al) published on Jul. 23rd, 1991. A pressure reducing valve is mounted directly on a high pressure gas cylinder. When a standard adaptor is inserted in the outlet and a control handwheel is opened, gas is available at the outlet at a required low pressure, for example a maximum pressure of 200 bar. When a special filling adaptor is inserted in the outlet, the cylinder can be refilled to its maximum pressure of 300 bar. The special filling adaptor has a seal which inhibits gas flow from a chamber in the valve assembly via a passage in the assembly to the surrounding atmosphere. This in turn inhibits a piston moving downwardly to close the inlet of the pressure reducing valve as would be the case in normal service.

However these prior disclosures provide only limited function in the body of the assembly, namely normal low pressure regulation by manual control, and/or the ability to refill. Further functions required by the user are provided by discrete components joined in the usual way to the low pressure outlet.

Attempts have been made to provide for a number of different functions to be carried out by components mounted directly on the head of a compressed gas cylinder. In U.S. Pat. No. 5,086,807 (Lasnier et al/L'Air Liquide) published on Feb. 11th, 1992, there is disclosed a pressure reducer comprising a pressure reducer body including oppositely disposed bores for mounting inlet and outlet connecting devices, and the outer end of another bore defining a high pressure chamber in which the regulating valve is mounted. The pressure reducer body is adapted to receive a connecting device for a high pressure manometer defining a rest for a spring of a regulating valve which includes an annular truncated lining in which is force fittingly engaged a connecting rod between the regulating valve and the piston bounding the low pressure chamber. The invention proposes an industrial type pressure reducer of a simplified design, including a high pressure manometer and a low pressure manometer.

In U.S. Pat. No. 5,127,436 (Campion et al/L'Air Liquide) published on Jul 7th, 1992, there is disclosed a gas distribution adaptor and pressure reducer device for a high pressure gas cylinder. The device comprises an assembly intended to be mounted on a closure valve of the high pressure gas cylinder and comprises a manual control device operating a distribution valve in which the upstream end communicates with the closure valve, a pressure reducer and a safety device against over pressures between the distribution valve and an outlet for connection to a user circuit, as well as a manometer which measures the pressure upstream of the distribution valve.

However, yet again the number of functions provided in these devices mounted on the cylinder head is limited, and further functionality required is provided by conventional components connected to the outlet of the cylinder head control device.

In U.S. Pat. No. 5,163,475 (Gregoire/Praxair Technology, Inc.) published on Nov. 17th, 1992 there is disclosed a micro panel for the delivery of gas from a supply cylinder to a tool location comprising an arrangement of valves, pressure regulator and associated components adapted to enhance the purity of the delivered gas and the safety of the gas delivery panel. The object of the invention is to provide a reduced size micro panel adapted for the control of ultra high purity hazardous gases. The panel components are arranged and ported so that the gas flow path is preferably straight flow-through, with minimum bends and stagnant gas pockets. The micro panel components are arranged such that the gas passage parts therein are aligned essentially in the same plane. A single or unitary block of metal e.g. stainless steel, can be machined to provide fluid passage ports for the interconnection of the valves and pressure regulator components. However although the micro panel is reduced in size, it retains the complexity of a normal size gas panel, and contains numerous connections between discrete components. Also, the functions provided by the panel are limited in number, and when further functions are required these are provided by additional conventional components. Furthermore, when it is desired to refill the compressed gas cylinder, a conventional make and break is made in the high pressure part of the circuit, to remove the cylinder for refilling.

In an article entitled "A Revolutionary Actuator For Microstructures" in SENSORS, February 1993 by Helmers Publishing, Inc., describing products of Redwood MicroSystems, Inc. a solid state pressure regulator is described consisting of a micromachined pressure sensor and an electronic feedback loop, combined with a thermopneumatic actuator known by the trade mark "Fluistor". A cavity is etched in the silicon substrate and filled with a control liquid. When this liquid is heated, the silicon diaphragm flexes outward over the valve seat. The silicon diaphragm flexes outward to meet a second wafer bonded to the underside, which contains precise channels and holes designed to direct the flow of fluid to be controlled. The microvalve can be combined with a micromachined pressure or flow sensor and electronic feedback circuitry to create a small, accurate, and cost effective closed-loop control system. The valve can be used for proportional control of gas flow rates from microliters per minute to liters per minute. Integrating the microvalve with a pressure sensor or a flow sensor and electronic feedback circuitry provides a closed loop, programmable pressure regulator or flow regulator. Because the regulator can be controlled by digital or analogue signals, pressure and flow can be controlled using a personal computer, or an existing control system. Such components find particular use in embodiments of the present invention.

In U.S. Pat. No. 5,409,526 (Zheng et al/Air Products and Chemicals, Inc.) published on Apr. 25th, 1995, apparatus for supplying high purity gas comprises a cylinder having a valve with two internal ports. One internal port is used to fill the cylinder while the other is fitted with a purifier unit which removes particulates and impurities from the gas as it leaves the cylinder. The purified gas leaves the cylinder via the valve and after passing through a regulator, a flow control device and various lengths of tubing, all external to the apparatus and the cylinder, the gas passes through a conventional purifier to the point of use. The internal purifier reduces the load on the external purifier and decreases the frequency at which the purifier has to be recharged. The provision of two internal ports and internal valving allows provision for filling the container without the filling gas passing through the internal filter unit. However the pressure regulator is external to the cylinder head unit, so that changing the cylinder for refilling involves a conventional make and break at high pressure, upstream of the pressure reduction produced by the pressure regulator. Also, functional components such as the pressure regulator are connected by conventional means to the cylinder head unit, and are not mounted on the cylinder. This disclosure is an example of a cylinder mounted control device in which additional functionality, transparent to the user, is included in the cylinder package. The purifier and filtration media were added as cartridges to the cylinder valve. To maintain the integrity of the cylinder contents a residual pressure valve was included on the outlet port of the cylinder valve. The residual pressure valve prevents the cylinder from being contaminated by atmospheric contamination or contaminated from foreign gases by the user. To fill the cylinder and retain the integrity of the purifier and cylinder package the second internal port is provided, and contains an additional isolation valve for cylinder fills.

In U.S. Pat. No. 5,440,477 (Rohrberg et al/Creative Pathways, Inc.) published on Aug. 8th, 1995, there is disclosed a miniature gas management system comprising a complete gas manifold that includes computer-controlled valves, actuators, regulators and transducers. The entire system resides within a housing that sits on the top of a conventional gas cylinder that would normally be enclosed within a gas cabinet. Outside the housing, an upper control panel contains an LCD display and a lower control panel holds a key pad control, a removable data pack, LED indicator lights, and an emergency shut-off switch. Inside the housing, a neck protrudes upwardly from the gas cylinder and provides a connection for a supply of gas within it to the gas manifold. The gas manifold is an assembly of valves, actuators, pressure regulators, welded fittings and transducers. The top of the housing is fitted with a process gas outlet offset from the axis of the gas cylinder, a vent connection and a purge-gas inlet. The apparatus seeks to reduce size by having component-to-components welds, to reduce the number of mechanical connections.

Although the disclosure provides a concept of a miniaturised gas panel mounted on the cylinder, the system is still intended to make and break the connection between the cylinder and the gas panel at the full pressure of the gas cylinder, when refilling the cylinder. The concept is that the entire miniaturised gas panel is removed from the cylinder when a new cylinder is installed, and the old cylinder is refilled. Thus the make and break continue to be made at the relatively high pressure of the cylinder. Furthermore, although the number of functional components provided in the miniature gas panel is greater than are conventionally mounted on the gas cylinder, the required combination is set for the gas panel, or is made to order by conventional connections and welding. If additional functionality is required, this can only be provided by joining further discrete components in conventional manner.

In ER-A-2 735 209 (L'Air Liquide) published on Dec. 13th, 1996 there is disclosed a gas control device for use with a compressed gas cylinder, having a supporting body with a main gas flow path through the body, the supporting body having input connecting means for mounting the body on the compressed gas cylinder and connecting the gas flow path to communicate with the gas cylinder. The supporting body has formed within it an expansion valve providing pressure reducing means for providing gas in the flow path at a selected pressure substantially lower than that in the container, and a high pressure shut-off valve in the main gas flow path upstream of the pressure reducing means. Output connecting means are provided downstream of the pressure reducing means for connecting the main gas flow path to subsequent apparatus for utilizing the gas. The supporting body of the gas control device has filling means for filling the container with compressed gas through the input connecting means, by way of a passageway separate from the passageway through which the main gas flow path communicates with the pressurized gas cylinder. A high pressure gauge is provided upstream of the pressure reducing means, to provide an indication of the pressure in the compressed gas cylinder, and a low pressure gauge is provided downstream of the pressure reducing means. The expansion valve shown is located in a shaped cover forming a cylinder handling cap by which the gas cylinder can be maneuvered in use. Preferably the valve assembly is entirely located within the cap, which has access apertures for the various assembly inlets and outlets.

Although the gas control device disclosed provides additional functions in a single body mounted on top of the gas cylinder, which had not previously been provided in combination, the functions provided are limited to a high pressure shut-off valve, pressure reducing means, and high and low pressure gauges, and filling of the gas container by a separate inlet pathway while the gas control device is mounted on the gas container. Any other functions required by the user are provided by conventional components attached in series to the outlet connection of the gas control device, by way of discrete components in the normal way. The outlet of the main gas flow through the control device is generally perpendicular to the direction of the main gas flow through the body, and the threaded output connection is of conventional form for connection to further conventional components. Thus in summary, the functions provided by the device are limited, and the arrangements for adding further components are conventional by adding discrete components by normal junctions. Additional functions which may be required by the user of the compressed gas cylinder, for example purging functions, must be carried out by conventional components, separately connected to the various ports of the control device. There remains a need to provide a system which will give additional functions in a compact space, with flexibility to meet different requirements of different users of compressed gas containers.

In an article entitled "Benefits Of A Minimalist Gas System Design" by Phillips and Sheriff, in Solid State Technology, October 1996, there is described the design and construction of a fabrication plant for electronic equipment, including a gas control system. The main novel feature was that the pressure in the distribution system for each process gas was controlled by a single regulator at the gas source. This was in contrast to conventional arrangements in which separate local pressure regulation is usually installed for every process chamber gas loop to prevent interactions between multiple gas systems. The present invention finds application in gas control for fabrication systems such as described in the cited article.

In an article entitled "The Next Step In Process Gas Delivery: A Fully Integrated System" by Cestari, Laureta and Itafugi, in Semiconductor International, January 1997 there is described an integrated gas delivery system intended to reduce internal volumes and eliminate entrapment areas to reduce contamination, for use in semiconductor fabrication processes. The article describes the need for integration in the gas control system by configuring a standard set of modular components into a system to meet any gas delivery process requirements. Components must be designed to connect to each other directly or to a common manifold without the use of fittings or welding. Component modularity and interchangeability requires a standard form factor for valves, regulators, transducers, filters, mass flow controllers and other components. The advantage of interchangeable modular components is said to be that, irrespective of the specific function of the component within an integrated gas system, it connects in the same way and fits in the same space. The advantage is mentioned of purging a gas control system without the need to disconnect the gas line from the gas cylinder. The need is explained to eliminate the conventional convoluted gas flow path and large volume in the gas delivery system by an improved flow path. However, the systems described in the article continue to use discrete components and merely are concerned with the miniaturization of connections between discrete components.

U.S. Pat. No. 5,566,713 (Lhomer et al), published Oct. 22nd, 1996, relates to a gas control and dispensing assembly, intended to be connected to a tank containing the said gas under a high pressure, comprising a low-pressure outlet and, in series between the tank and the low-pressure outlet, a shut-off valve exposed to the high pressure, a pressure reducer means coupled to the shut-off valve and a flow regulator means. The object is said to be to provide a control and dispensing assembly which is in a compact and ergonomic unit form, typically permanently mounted on the gas tank or bottle and providing all the functional and safety features required, both for dispensing gas and for filling the tank. The gas control and dispensing assembly comprises a lower block mounted on a gas bottle and comprising a manometer and a filling connector, and on which a subassembly is permanently mounted, axially movable in response to rotation of a tubular control and actuation member surrounding the subassembly, which contains a pressure reducer and an indexable flow regulator and has a low-pressure outlet and a medium-pressure outlet.

EP-A-0 588 531 (Kabushiki Kaisha Neriki) published Mar. 23rd, 1994, relates to a valve assembly adapted to be attached to a gas cylinder containing a compressed gas and a liquefied gas for use in discharging out and charging the gas. A gas inlet, a stop valve, a pressure reducing valve and a gas outlet are arranged in series within a valve casing. The gas outlet and an outlet of said stop valve communicate with each other by a gas charging passage provided with a check valve. The gas outlet communicates with a secondary safety valve by a gas inducting passage. When a gas cylinder is charged with a gas, a gas charging mouthpiece is attached to the gas outlet. Thereupon, an opening or closing portion provided in the gas inducting passage is closed by an actuating portion provided in the mouthpiece. Thereby high pressure gas is not released from the secondary safety valve.

EP-A-0 459 966 (GCE Gas Control Equipment AB), published Dec. 4th, 1991, relates to an arrangement in a gas regulator intended to be connected to a gas holder, to permit using the regulator also as shut-off and filling valve for the gas holder. The regulator is of the cocurrent type and contains a differential pressure piston having different cross-sectional areas on the upper and the lower part thereof, which parts are sealed with respect to the regulator housing. Between the upper part of the piston and the regulator housing is provided a spring tending to move the piston away from the valve seat. The piston is manually displaceable towards the valve seat by means of an operating member acting on the upper part of the piston. The regulator also comprises a safety valve.

According to the present invention in a first aspect there is provided a modular gas control device for use with a container of compressed gas comprising a primary module, and a secondary module mounted on the primary module, the primary module comprising a first supporting body having a first main gas flow path through the body, the supporting body having input connecting means for mounting the body on a container of compressed gas and connecting the gas flow path to communicate with the gas container, pressure reducing means for providing gas in the flow path at a selected pressure substantially lower than that in the container, output connecting means downstream of the pressure reducing means for providing an outlet from the main gas flow path, a high pressure shut-off valve in the gas flow path upstream of the pressure reducing means, filling means for filling the container with compressed gas through the input connecting means, and a purge-gas inlet valve upstream of the pressure reducing means for admitting purge-gas to the main gas flow, said secondary module comprising a second supporting body having a second main gas flow path through the body, the second supporting body having second input connecting means for mounting the body on the primary module and connecting the second main gas flow path to the output connecting means of the primary module, and second output connecting means for providing an outlet from the second main gas flow path, the supporting body of the secondary module having a combination of at least two functional components for carrying out functions relating to gas flow.

Preferably the said at least two functional components comprise means for measuring and/or varying parameters of gas flow in the second supporting body, and/or for switching and/or venting and/or mixing gas flow in the second supporting body.

Preferably each supporting body of each module is a single body of material on or in which the functional components are mounted. However in some arrangements the supporting body may comprise two or more subsidiary bodies secured together to produce the supporting body on or in which the components are mounted. In some arrangements the supporting body may be metal with openings drilled or otherwise formed in the metal to receive functional components such as valves. In other arrangements however the device may be constructed in accordance with micro electro-mechanical systems (MEMS) technology, for example using a thermopneumatic microvalve formed in a body of silicon. Conveniently the same silicon body may then be used to provide a substrate for electronic printed circuits defining appropriate electronic control circuits for controlling the valve.

It is particularly preferred that the first supporting body of each module is structurally supported on the container solely by the input connecting means, for example by a conventional threaded boss entering into the conventional threaded opening of the top of a compressed gas cylinder. Preferably each module includes a housing surrounding the supporting body and spaced therefrom, the housing being shaped to provide means for handling the gas container. Conveniently openings may be made in the housing to give access to ports and components of the supporting body, and conveniently resilient material may be provided in the spacing between the supporting body and the housing.

It is particularly preferred that for each module the main gas flow path through the module is generally aligned for at least part (preferably at least the majority) of its length along a principal axis of the supporting body, which principal axis extends through the input connecting means and the output connecting means of the module, the principal axes of the two modules being coaxial. Where the gas container is a conventional gas cylinder, it is preferred that the gas control device is mounted on the gas container with the principal axes of the modules coaxial with the axis of the cylinder.

In some arrangements, the first supporting body also may have a high-pressure indicator upstream of the pressure-reducing means for indicating the pressure in the container, and a safety relief device comprising a rupture disc or a relief valve.

Preferably the first input connecting means comprises first and second flow paths, the first flow path leading from the container to the main gas flow path through the first supporting body, and the second flow path leading from the container to the said filling means. In such a case, there may be provided purifying means positioned within the gas container, interposed between the first flow path and the interior of the container for purifying gas leaving the container and passing into the said first main flow path.

In general in the various aspects of the invention, where the device includes purifying means, this can conveniently comprise a unit containing a substance selected from the group consisting of adsorbents, absorbents and mixtures thereof, whereby impurities are removed from the gas as it is withdrawn from the container thorough the unit. The unit may conveniently be as described in U.S. Pat. No. 5,409,526 (Zheng et al) the contents of which are incorporated herein by reference.

Preferably the primary module will include components giving further functions, and in a preferred example the first supporting body also has in the first main gas flow path upstream of the pressure reducing means, a high-pressure safety relief device, or a high-pressure safety-relief region adapted to provide structure for mounting of a safety relief device; and/or downstream of the pressure reducing means, a low pressure indicator, or a low-pressure indicator region adapted to provide structure for a pressure indicator for indicating the pressure in the main gas flow path downstream of the pressure reducing means. Preferably the first supporting body also has a high-pressure indicator upstream of the pressure-reducing means for indicating the pressure in the container. The said safety relief device may be a rupture disc, or a relief valve. The said structure provided for mounting a functional component may comprise a shaped portion of the first supporting body adapted to be drilled out during manufacture of the gas control device when the functional component is required in the finished product.

It will be appreciated that the invention extends to the provision of a gas control device in which certain functional components are not always provided, dependent upon the customer requirement. However, for flexibility and ease of manufacture, the invention encompasses structures in which provision is made for supplying the further functional components, if and when required. By way of example, the said structure provided for mounting a functional component may comprise a shaped portion of the first supporting body adapted to be drilled out during manufacture of the gas control device when the functional component is required in the finished product.

The secondary module may be selected by customer requirement from one of a number of compatible secondary modules. In one example the secondary module is a vacuum module comprising a vent port and switchable valve means for connecting the second input and output connecting means in a flow path such that gas from the compressed gas cylinder vents through the vent port, and produces a vacuum at the output connecting means for evacuating further apparatus connectable to the output connecting means of the secondary module, the valve means being switchable to selectively direct gas flow from the input connecting means of the secondary module to either the vent means or the output connecting means. In another example, the secondary module is a purge module having switchable valve means for admitting purge-gas through a purge-gas inlet and directing the purge-gas through the module, out through an outlet connecting means and thence to purge a use apparatus. In a further example the secondary module is a mixer module having controllable valve means for adding to the gas flow through the main gas flow path of the secondary module a further gas so as to supply a mixture of gases at the output connecting means, and in one example the secondary module may include a source of the said further gas. In another example, the secondary module may include a further input means adapted to be connected to a source of said further gas external to the secondary module.

In accordance with a second aspect of the present invention, there is provided a modular gas control device for use with a container of compressed gas comprising a primary module, and a secondary module mounted on the primary module, the primary module comprising a first supporting body having a first main gas flow path through the body, the supporting body having input connecting means for mounting the body on a container of compressed gas and connecting the gas flow path to communicate with the gas container, pressure reducing means for providing gas in the flow path at a selected pressure substantially lower than that in the container, output connecting means downstream of the pressure reducing means for providing an outlet from the main gas flow path, a high pressure shut-off valve in the gas flow path upstream of the pressure reducing means, and filling means for filling the container with compressed gas through the input connecting means, said secondary module comprising a second supporting body having a second main gas flow path through the body, the second supporting body having second input connecting means for mounting the body on the primary module and connecting the second main gas flow path to the output connecting means of the primary module, and second output connecting means for providing an outlet from the second main gas flow path, the supporting body of the secondary module having a combination of two or more functional components for carrying out functions relating to gas flow, the gas container comprising a cylinder having a main cylinder axis, and each module having a principal axis passing through its input connecting means and its output connecting means, the main flow path of each module being aligned along its principal axis for at least part of the length thereof, and the principal axis of each module being substantially coaxial with the main cylinder axis.

The device may include at least two secondary modules, the first mentioned secondary module being mounted on the primary module, and the or each further secondary module being mounted to form a stack of secondary modules one above the other.

Preferred and optional features which have been set out with regard to previous and subsequent aspects of the invention, may also be provided in accordance with this aspect of the invention.

In accordance with a third main aspect of the present invention, there is provided a set of modules for providing a modular gas control device for use with a container of compressed gas, the set of modules comprising a primary module, and a plurality of secondary modules each adapted to be mounted on the primary module or on a further secondary module, the primary module comprising a first supporting body having a first main gas flow path through the body, the supporting body having input connecting means for mounting the body on a container of compressed gas and connecting the gas flow path to communicate with the gas container, pressure reducing means for providing gas in the flow path at a selected pressure substantially lower than that in the container, output connecting means downstream of the pressure reducing means for providing an outlet from the main gas flow path, and filling means for filling the container with compressed gas through the input connecting means, each secondary module comprising a second supporting body having a second main gas flow path through the body, the second supporting body having second input connecting means for mounting the body on the primary module or on a further secondary module and connecting the second main gas flow path to the main gas flow path of the primary module or the further secondary module, and second output connecting means for providing an outlet from the second main gas flow path, the supporting body of each secondary module having a combination of two or more functional components for carrying out functions relating to gas flow.

Preferably, the first supporting body also has a high-pressure purge-gas inlet valve upstream of the pressure reducing means for admitting purge-gas to the main gas flow.

In one particularly preferred arrangement, the primary module and secondary modules are arranged in a vertical stack of modules, the uppermost module having its output connecting means positioned on a side face of the supporting body.

Preferred and optional features which have been set out with regard to previous and subsequent aspects of the invention, may also be provided in accordance with this aspect of the invention.

In accordance with a fourth main aspect of the present invention, there is provided a modular gas control device for use with a container of compressed gas comprising a primary module, the primary module comprising a supporting body having a main gas flow path through the body, the supporting body having input connecting means for mounting the body on a container of compressed gas and connecting the gas flow path to communicate with the gas container, pressure reducing means for providing gas in the flow path at a selected pressure substantially lower than that in the container, a high pressure shut-off valve in the gas flow path upstream of the pressure reducing means, and filling means for filling the container with compressed gas through the input connecting means, the supporting body also having, downstream of the pressure reducing means, output connecting means for providing an outlet from the main gas flow path and for mounting on the primary module a secondary module communicating with the main gas flow path of the primary module.

It is a particularly preferred feature in this aspect of the invention that the output connecting means is positioned on an upper region, preferably an upper face, of the primary module for mounting the second module above the primary module.

In some arrangements the supporting body also has a purge-gas inlet valve upstream of the pressure reducing means for admitting purge-gas to the main gas flow.

Preferred and optional features which have been set out with regard to previous and subsequent aspects of the invention, may also be provided in accordance with this aspect of the invention.

In accordance with a fifth main aspect of the invention there is provided a modular gas control device for use with a container of compressed gas comprising a primary module, and a secondary module mounted on the primary module, the primary module comprising a supporting body having a first main gas flow path through the body, the supporting body having input connecting means for mounting the body on a container of compressed gas and connecting the gas flow path to communicate with the gas container, pressure reducing means for providing gas in the flow path at a selected pressure substantially lower than that in the container, output connecting means downstream of the pressure reducing means for providing an outlet from the main gas flow path, a high pressure shut-off valve in the gas flow path upstream of the pressure reducing means, and filling means for filling the container with compressed gas through the input connecting means, the first supporting body also having in the main gas flow path upstream of the pressure reducing means, a high-pressure safety relief device, or a high-pressure safety-relief region adapted to provide structure for mounting of a safety relief device, upstream of the pressure reducing means, a purge-gas inlet valve, or a purge-gas inlet region adapted to provide structure for a purge-gas inlet valve; and downstream of the pressure reducing means, a low pressure indicator, or a low-pressure indicator region adapted to provide structure for a pressure indicator for indicating the pressure in the fluid flow path downstream of the pressure reducing means, said secondary module comprising a second supporting body having a second main gas flow path through the body, the second supporting body having second input connecting means for mounting the body on the primary module and connecting the second main gas flow path to the output connecting means of the primary module, and second output connecting means for providing an outlet from the second main gas flow path, the supporting body of the secondary module having a combination of at least two functional components for carrying out functions relating to gas flow.

Preferred and optional features which have been set out with regard to previous and subsequent aspects of the invention, may also be provided in accordance with this aspect of the invention.

The present invention also encompasses in further aspects a gas control device, which is not necessarily for use with other modules. In such a case, there may be provided a gas control device for use with a container of compressed gas comprising : a supporting body having a main gas flow path through the body; the supporting body having: input connecting means for mounting the body on a container of compressed gas and connecting the main gas flow path to communicate with the gas container; pressure reducing means for providing gas in the flow path at a selected pressure substantially lower than that in the container; output connecting means downstream of the pressure reducing means for connecting the main gas flow path directly or indirectly to apparatus for utilizing the gas; a high pressure shut-off valve in the main gas flow path upstream of the pressure reducing means; and filling means for filling the container with compressed gas through the input connecting means; the supporting body also having, upstream of the pressure reducing means, a purge-gas inlet valve or a purge-gas inlet region adapted to provide structure for a purge-gas inlet valve.

Preferred and optional features which have been set out with regard to previous and subsequent aspects of the invention, may also be provided in accordance with this aspect of the invention.

It is to be appreciated that where features of the invention are set out herein with regard to devices according to the invention, such features may also be provided with regard to a method according to the invention, and vice versa.

In particular, and without prejudice to the generality of the foregoing statement, there is provided in accordance with one aspect of the invention a method of supplying compressed gas comprising the steps of providing a compressed gas container having mounted thereon a primary gas control module comprising a first supporting body having a first main gas flow path through the body, the supporting body having first input connecting means for mounting the body on the compressed gas container and connecting the gas flow path to communicate with the gas container, pressure reducing means for providing gas in the flow path at a selected pressure substantially lower than that in the container, first output connecting means downstream of the pressure reducing means, and filling means for filling the container with compressed gas through the input connecting means, connecting the output connecting means to a secondary gas control module, said secondary module comprising a second supporting body having a second main gas flow path through the body, the second supporting body having second input connecting means for mounting the body on the primary module and connecting the second main gas flow path to the output connecting means of the primary module, and second output connecting means for connecting the second main gas flow path directly or indirectly to apparatus for utilizing the gas, the supporting body of the secondary module having at least two functional components for carrying out functions relating to gas flow, discharging gas from the container to the use apparatus through the gas control modules, disconnecting the use apparatus while the primary gas control module is mounted on the gas container, filling the gas container through the filling means while the primary gas control module is mounted on the gas container, and reconnecting the use apparatus while the primary gas control module is mounted on the cylinder.

In accordance with a further aspect of the present invention concerned with a method, there may be provided a method of supplying compressed gas comprising the steps of providing a compressed gas container having mounted thereon a gas control device comprising a supporting body having a gas flow path through the body, the supporting body having input connecting means for mounting the body on the compressed gas container and connecting the gas flow path to communicate with the gas container, pressure reducing means for providing gas in the flow path at a selected pressure substantially lower than that in the container, output connecting means downstream of the pressure reducing means; filling means for filling the container with compressed gas through the input connecting means, and a purge-gas inlet valve upstream of the pressure reducing means, connecting the output connecting means directly or indirectly to a use apparatus for utilizing the gas, discharging gas from the container to the use apparatus through the gas control device, disconnecting the use apparatus while the gas control device is mounted on the gas container, filling the gas container through the filling means while the gas control device is mounted on the gas container, inputting purge-gas into the main flow path through the purge-gas valve while the gas control device is mounted on the gas container, and reconnecting the use apparatus while the gas control device is mounted on the cylinder.

Reference will now be made to a sixth main aspect of the invention concerned with providing a separate filling circuit for a gas cylinder, the filling circuit being separate from the main outlet circuit from the gas cylinder. In accordance with such an aspect of the invention, there is provided a gas control device for use with a container of compressed gas comprising a supporting body having a main gas flow path through the body; the supporting body having input connecting means for mounting the body on a container of compressed gas and connecting the main gas flow path to communicate with the gas container; pressure reducing means for providing gas in the flow path at a selected pressure substantially lower than that in the container; output connecting means downstream of the pressure reducing means for connecting the main gas flow path directly or indirectly to apparatus for utilizing the gas; a high pressure shut-off valve in the main gas flow path upstream of the pressure reducing means; and filling means for filling the container with compressed gas through the input connecting means; in which the input connecting means comprises first and second flow paths and, the first flow path leading from the container to the main Gas flow path through the supporting body, and the second flow path leading from the container to the said filling means, said filling means including a second high pressure shut-off valve.

Preferred and optional features which have been set out with regard to previous and subsequent aspects of the invention, may also be provided in accordance with this aspect of the invention.

In a particularly preferred form, there is provided purifying means positioned within the gas container, interposed between the first flow path and the interior of the container for purifying gas leaving the container and passing into the said main gas flow path.

Preferably the supporting body is a single body of material on or in which the functional components are mounted, and preferably the supporting body is structurally supported on the container solely by the input connecting means.

Preferably the device includes a housing surrounding the supporting body and spaced therefrom, said housing being shaped to provide means for handling the gas container, and preferably the device includes a purge-gas inlet valve upstream of the pressure reducing means for admitting purge-gas to the main gas flow path.

In some arrangements the output connecting means is positioned on an upper region, preferably an upper face, of the supporting body, and in other arrangements the output connecting means is positioned on a side region, preferably a side face, of the supporting body.

It is to be appreciated that the positioning of the output connecting means of a gas control device on either an upper face, or a side face, of the supporting body, is a consideration which affects the invention in all the aspects set out hereinbefore. In general, it is a particularly preferred feature that a module may be provided with an upwardly directed or facing output connecting means, when it is intended that a further module shall be coupled to the gas control device by way of the upwardly directed output connecting means. However, where it is intended that the module concerned shall be fitted singly to the top of a gas cylinder, with no other modules involved, or where it is intended that the module shall be the uppermost module of a series of modules secured to the top of a gas cylinder, then in such circumstances it is preferred that the output connecting means is directed or facing sideways from the module. Preferably the output connecting means faces horizontally sideways from the supporting body, although in certain circumstances the output connecting means can be directed at a angle upwardly or downwardly from a side face of the module. In yet another variation, the output connecting means may be mounted on an upper surface of the module, but may be arranged to be directed horizontally sideways at its opening when unconnected to other equipment.

However the preferred arrangement for a sole, or uppermost, module, is that the output connecting means is mounted on a side face of the module, and faces horizontally sideways from the module. Such an arrangement gives advantage in reducing the likelihood of contaminants entering the output connection means, when the output connecting means is not connected to further equipment.

In one particularly preferred independent aspect of the invention there is provided a gas control device for use with a container of compressed gas, comprising a primary module and a series of secondary modules arranged in a vertical stack of modules, the uppermost module having its output connecting means positioned on a side face of the module. Preferably the modules are constructed in accordance with any one or more of the features set out hereinbefore.

Preferred and optional features which have been set out with regard to previous and subsequent aspects of the invention, may also be provided in accordance with this aspect of the invention.

The present invention, at least in preferred embodiments thereof, provides a number of advantages over previous gas control devices and methods. Rather than just connecting a number of discrete components into a smaller control panel system, which has been proposed in some miniaturised gas control systems, the present invention encompasses redesigning and machining a group of components directly into a single body (for mechanical units), or onto an electronic chip (for example in micro-electro-mechanical system units). The invention may provide a series of modules. Each of these is independent and has distinct functions. By combining pressure regulation with other modules, the system can be extended to meet additional customer needs such as purification, vaporization, mixture generation and so on. In preferred forms all modules can give electrical output signals for indication, and receive electrical input signals for control. An integrated design can be achieved, especially with the main gas flow paths aligned along the axis of a compressed gas cylinder, to minimize leaks, eliminate dead space and redundant joints, to improve product quality and purity whilst lowering system costs.

By designing a number of different control modules for different applications, the modules can be combined to meet various customer and market needs, including the following functions:

- built-in residual pressure control & safety relief
- pressure module for regulating gas pressure from cylinders
- flow control module
- filtration and/or purifier module for control of UHP gases for electronics
- venturi module for evacuation in corrosive, toxic, and pyrophoric applications
- electronic control of pressure regulation for electronics
- vaporizer module for converting liquefied products into gas
- analyzer module to monitor gas quality
- mixture module for generation of reference gas mixtures
- gas blending module for processing gas mixtures fully automated control functions for electronics remote data acquisition, storing and control, e.g. telemeter.

The invention finds particular application in integrated circuit manufacture normally requiring the use of a gas cabinet for handling toxic, corrosive, and/or pyrophoric gases.

Embodiments of the invention will now be described by Way of example with reference to the accompanying drawings in which.

Figure 5:
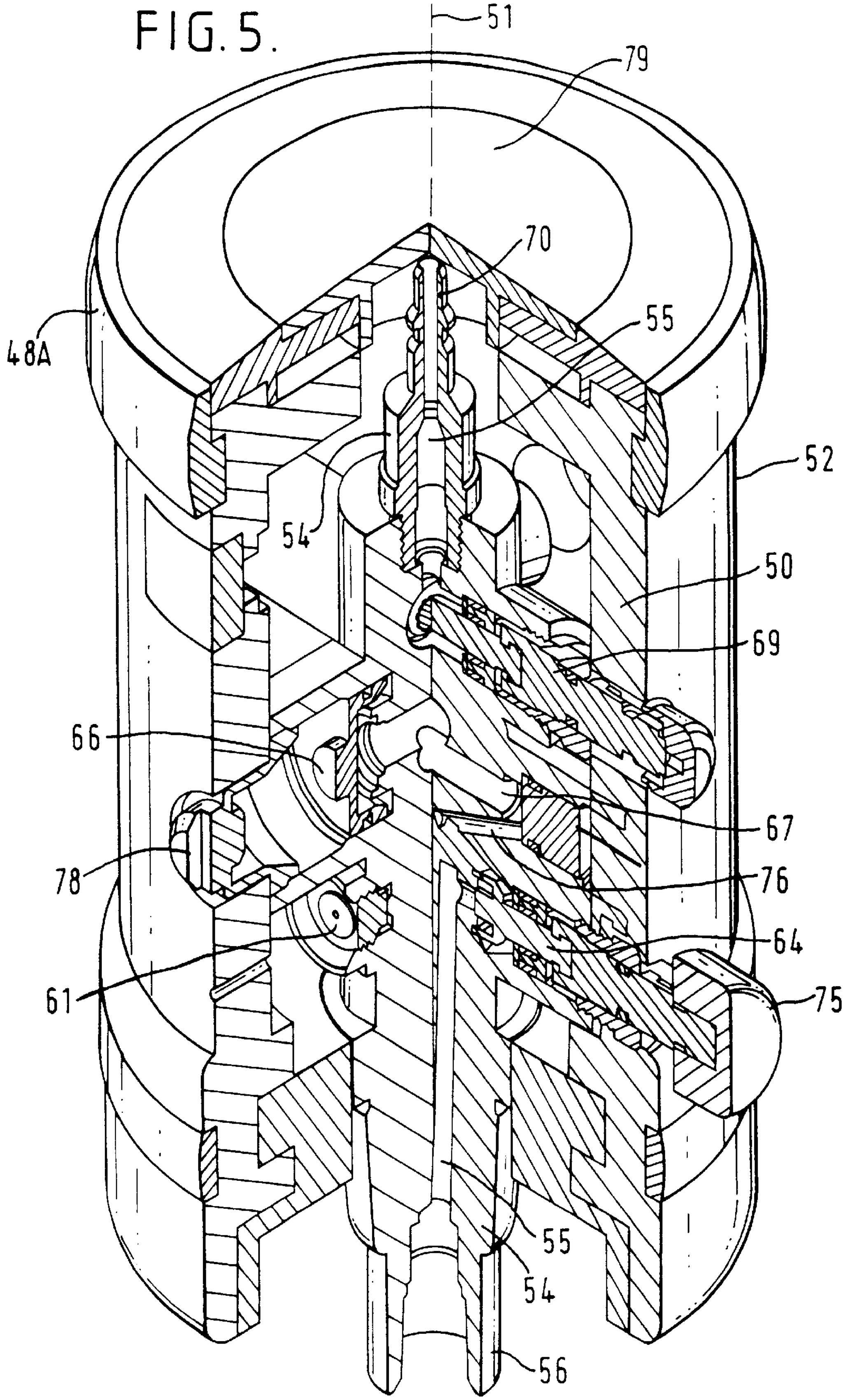
FIG. 5 is a diagrammatic 3-dimensional view, partly in section, of a primary module gas control device shown diagrammatically in FIG. 3.
Figure 5A:
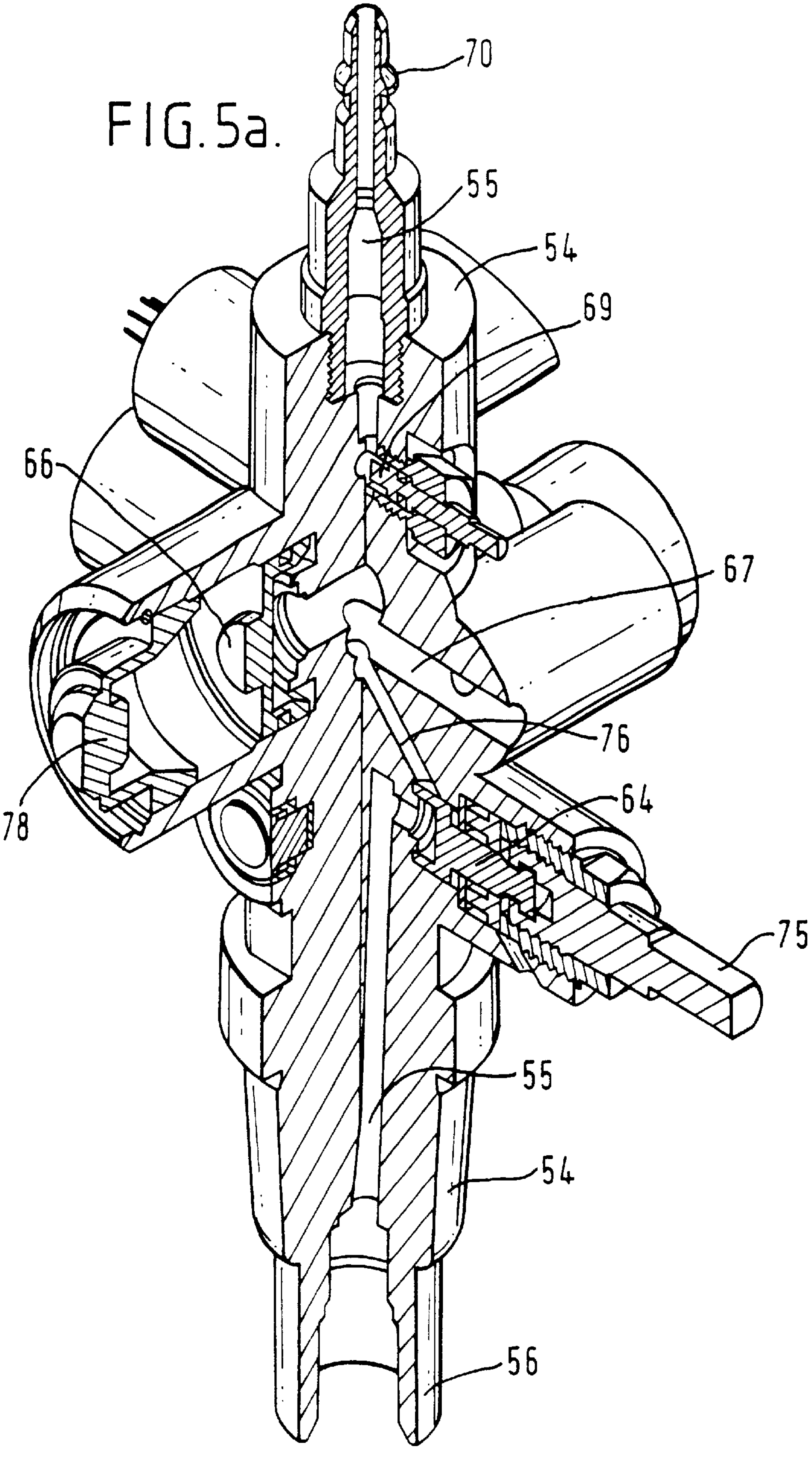
Figure 5B:
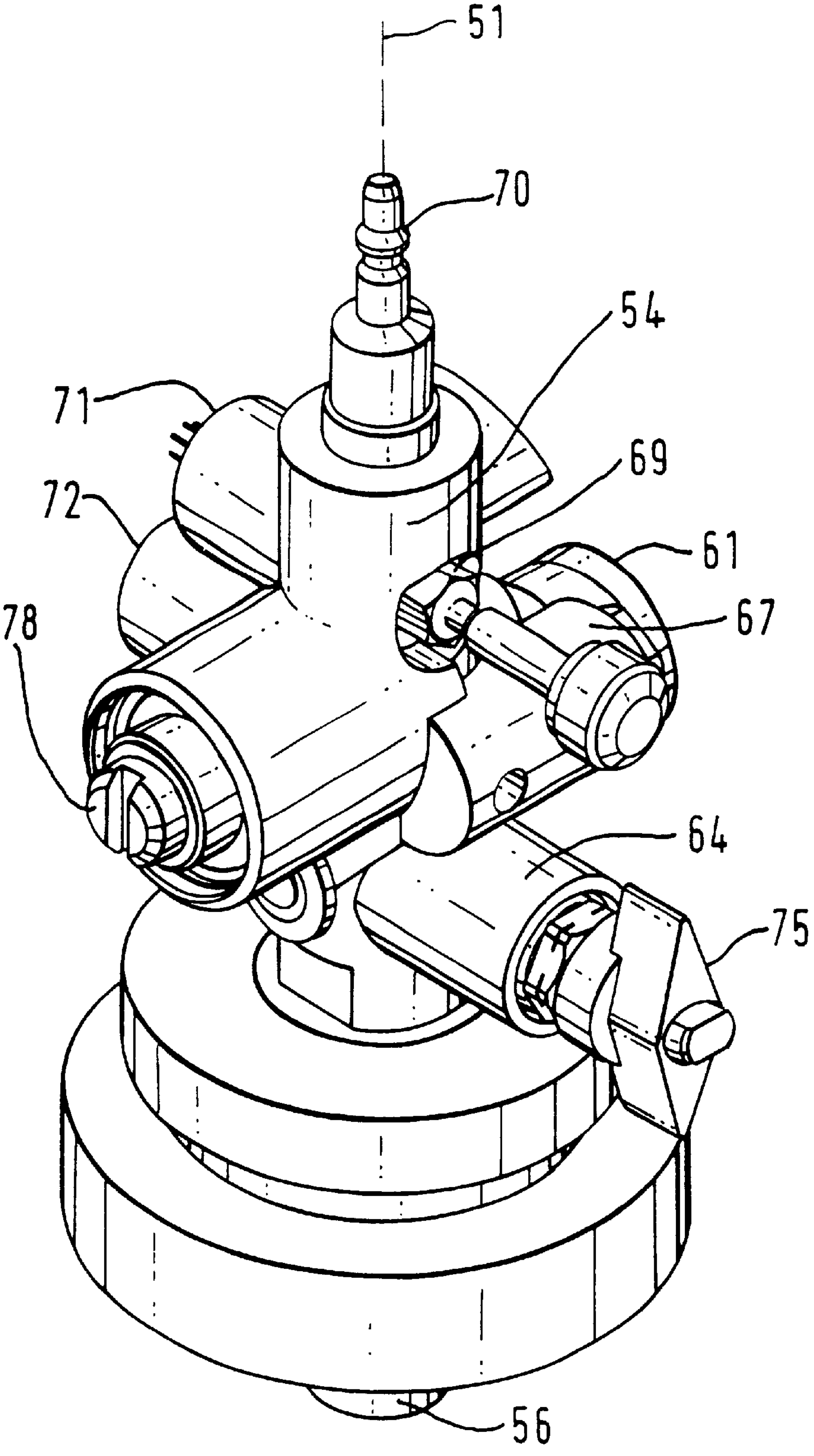
Figure 5C:
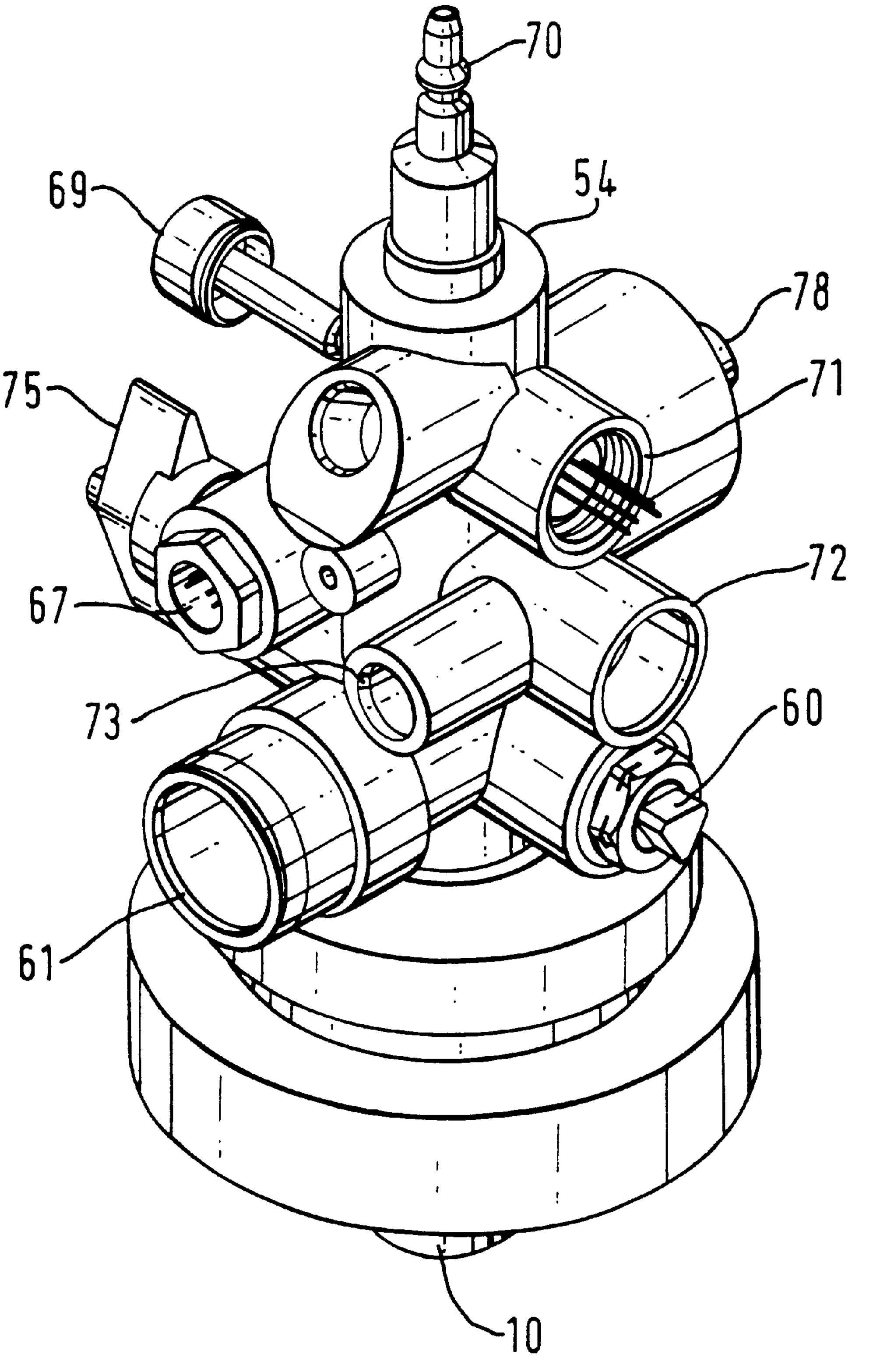

FIG. 5*a* is a further diagrammatical 3-dimensional view showing the internal arrangement of FIG. 5 in more detail;

FIG. 5*b* is a 3-dimensional diagrammatical representation of the exterior of the components shown in FIG. 5*a*, with the addition of further components at the base;

FIG. 5*c* is a 3-dimensional perspective view of the far side of the device shown in FIG. 5*b;*

Figure 3:
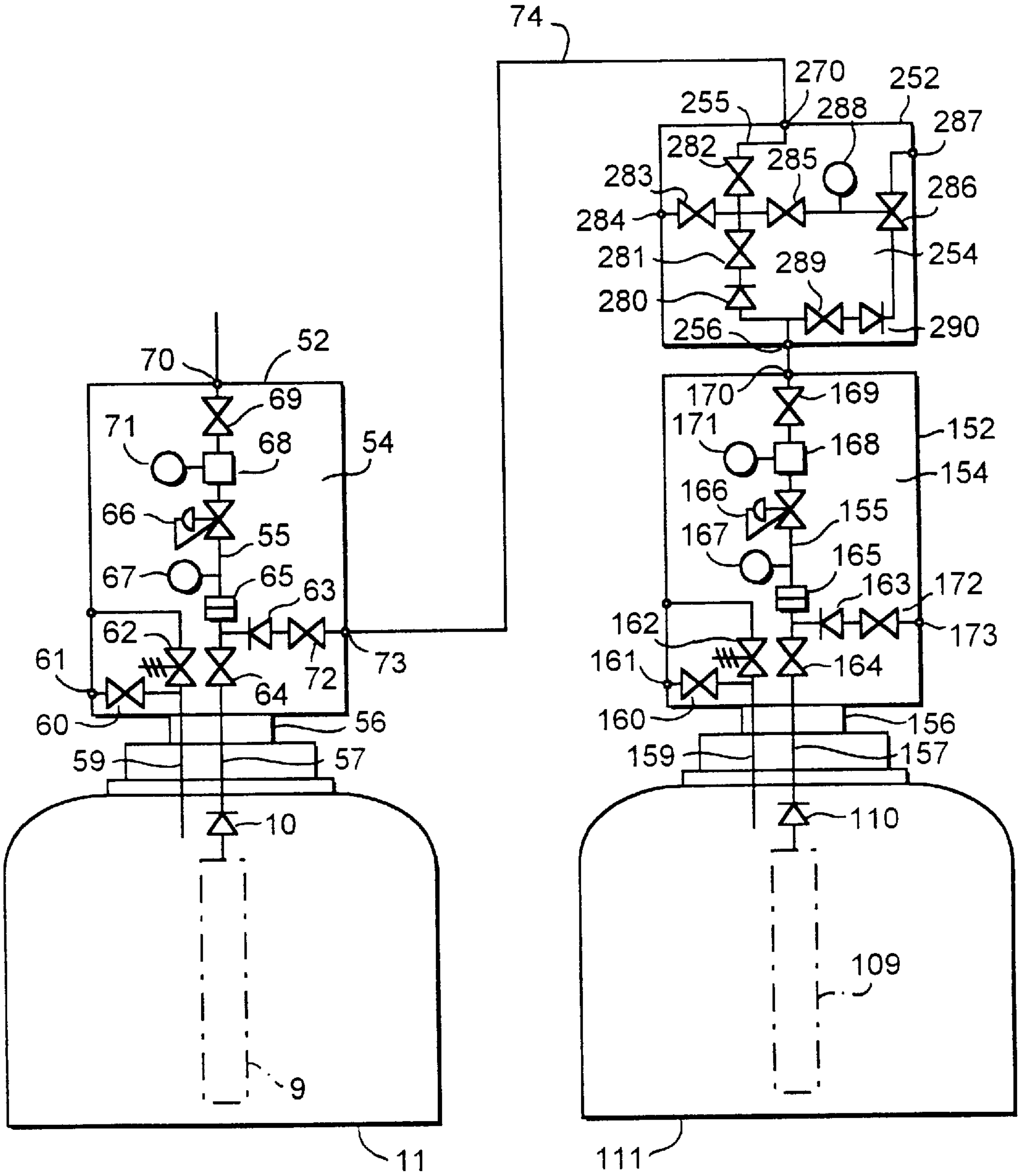
FIG. 3 is a diagrammatic representation of a gas control system embodying the present invention, for carrying out the functions shown in a conventional gas cabinet in FIG. 2.
Figure 6:
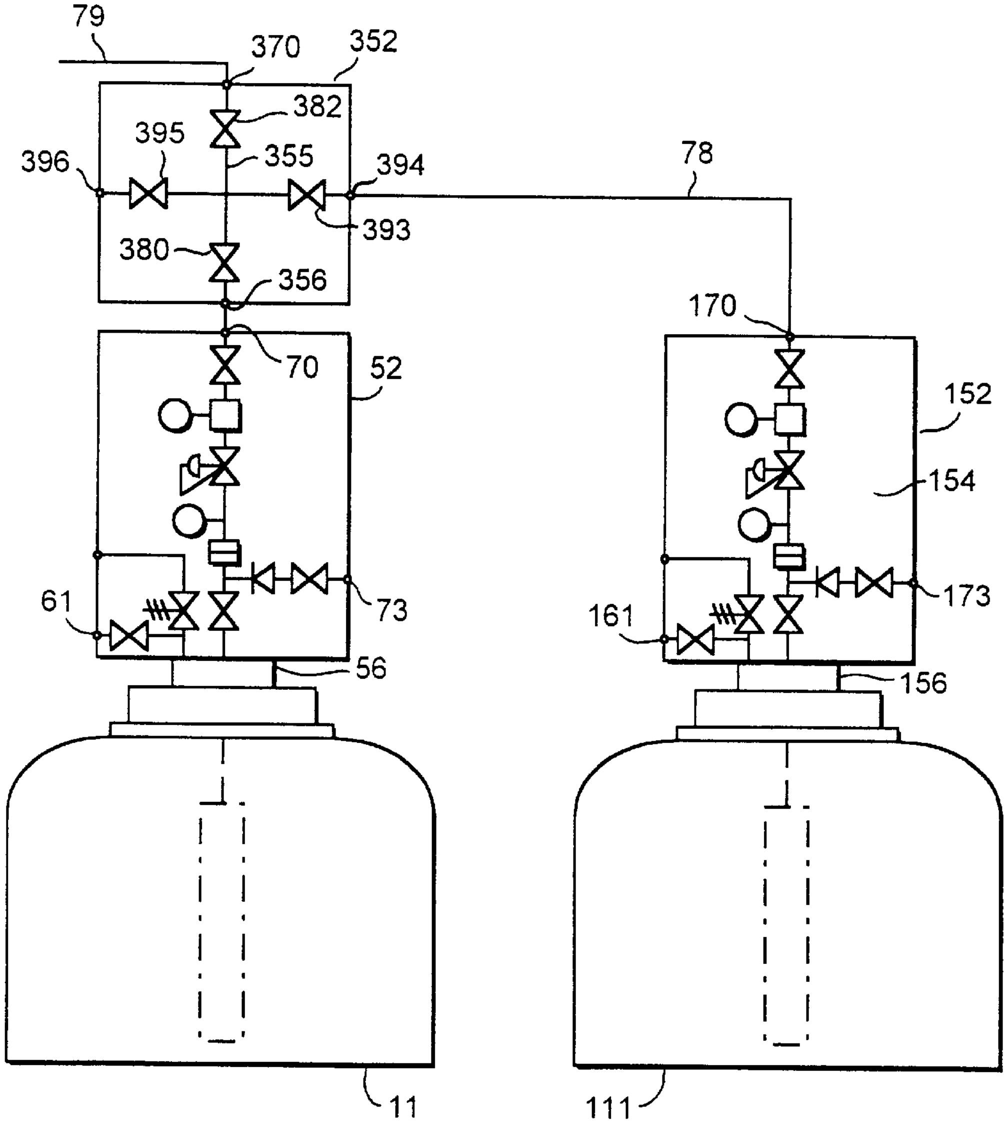
Figure 7A:
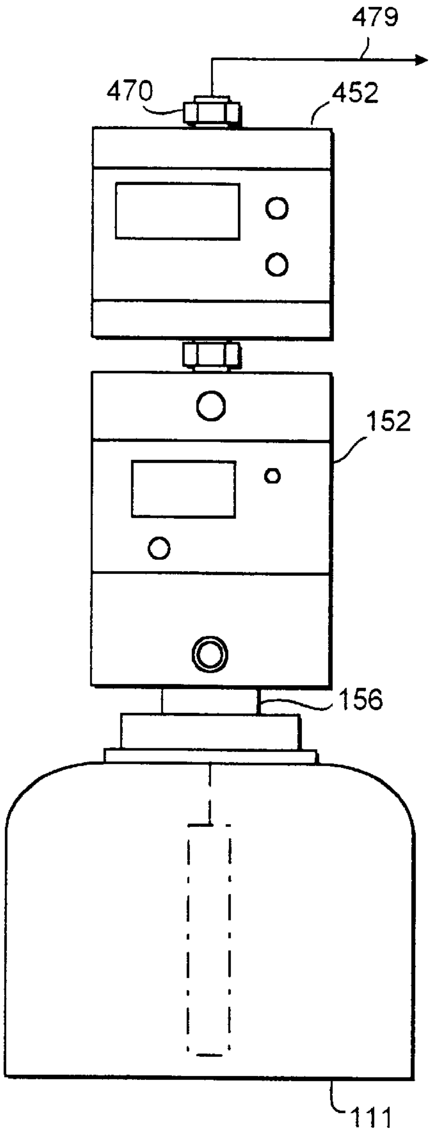
Figure 7B:
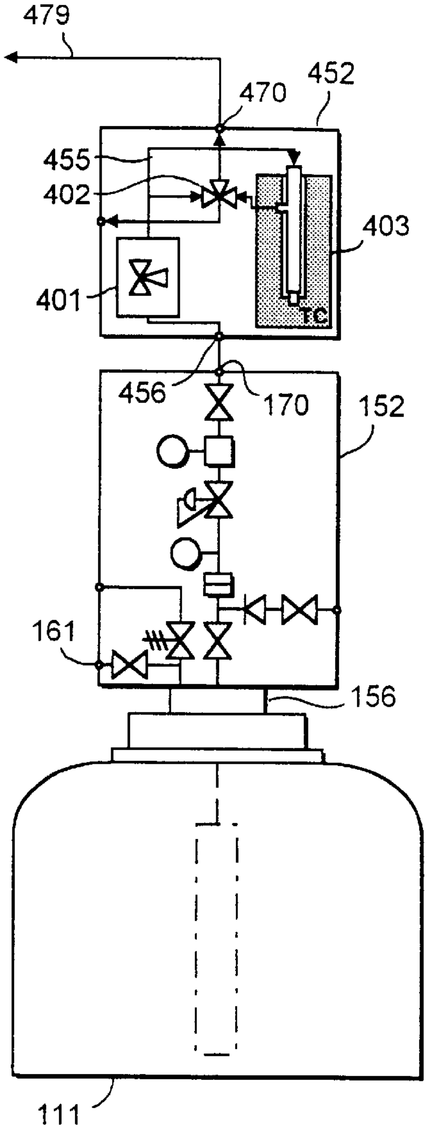
Figure 8:
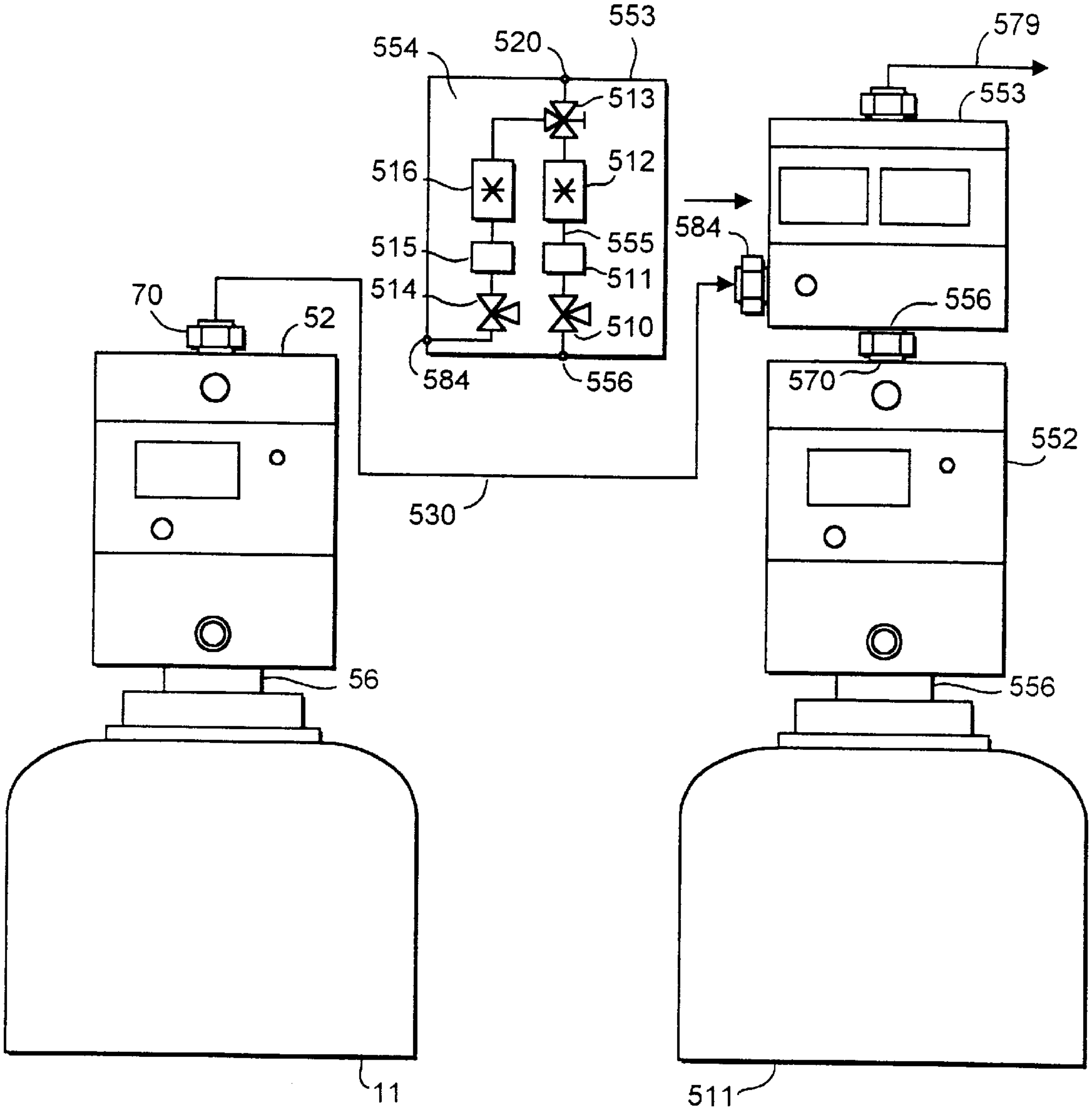
Figure 9D:
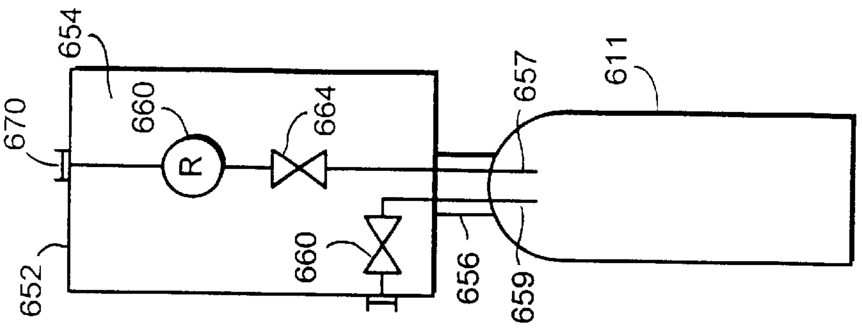
Figure 10A:
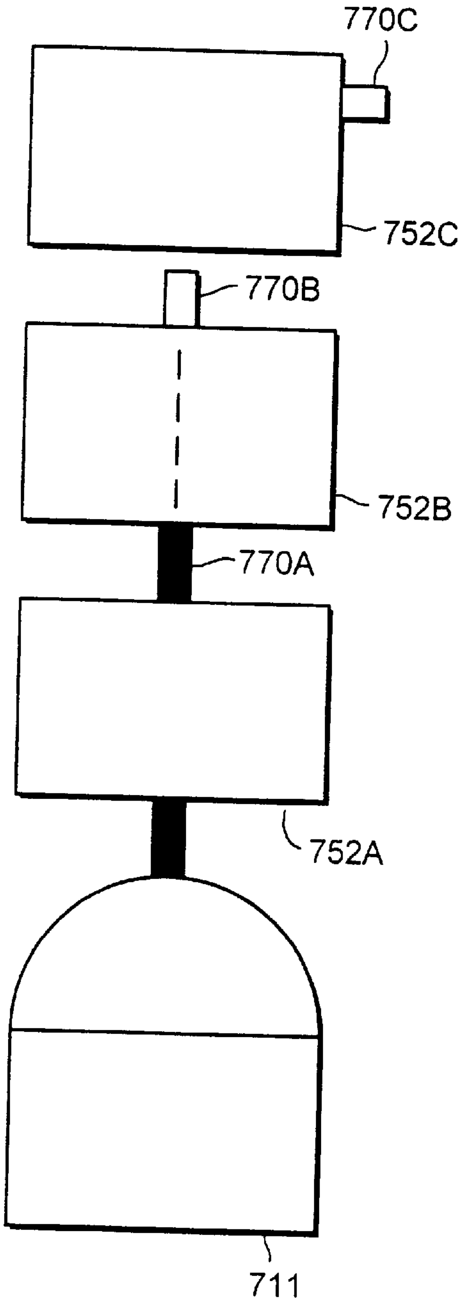
Figure 10B:
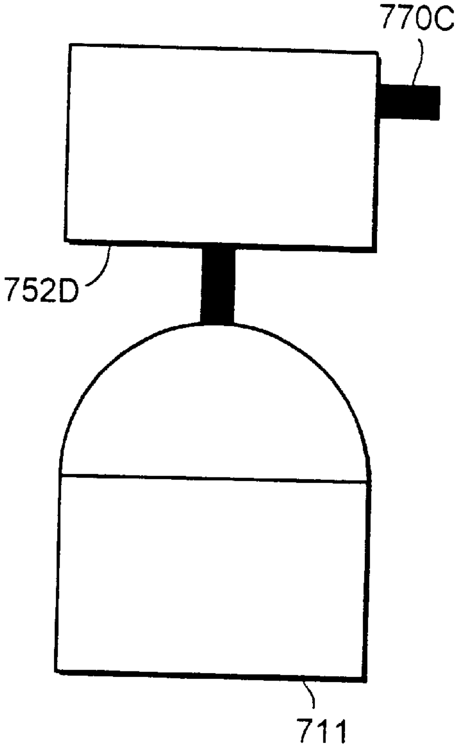
Figure 10C:
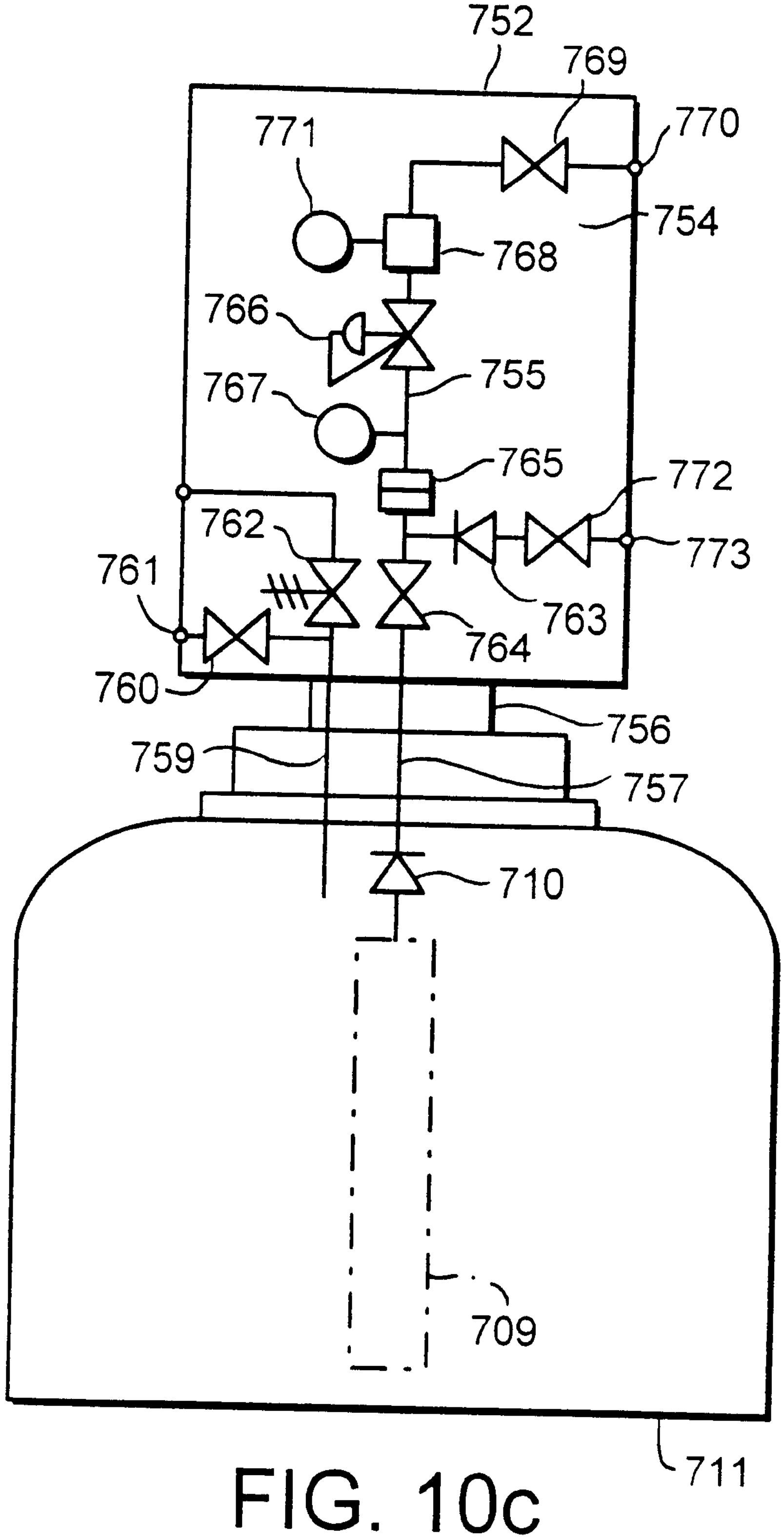
Figure 10D:
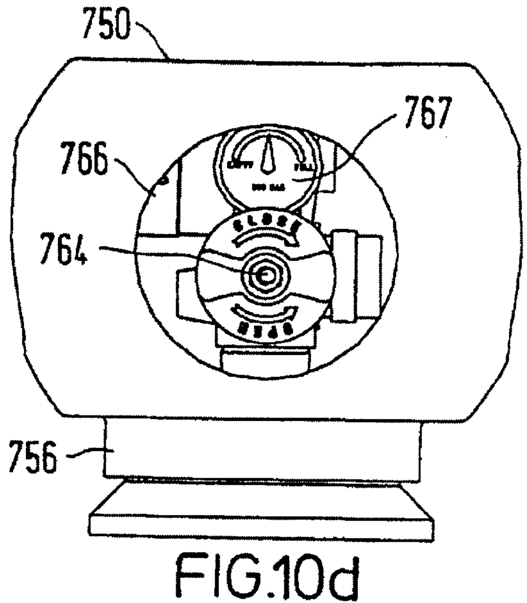
Figure 10E:
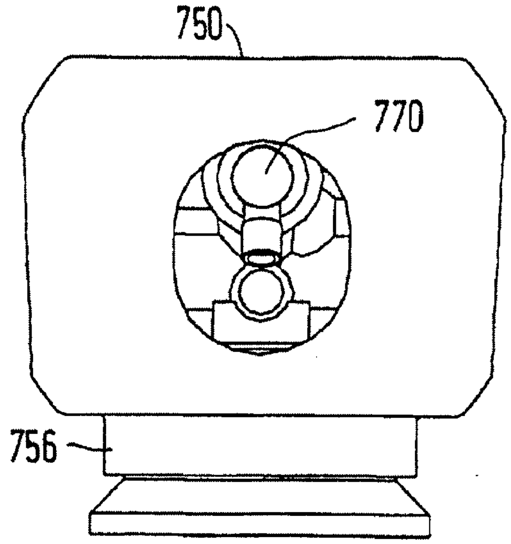
Figure 10F:
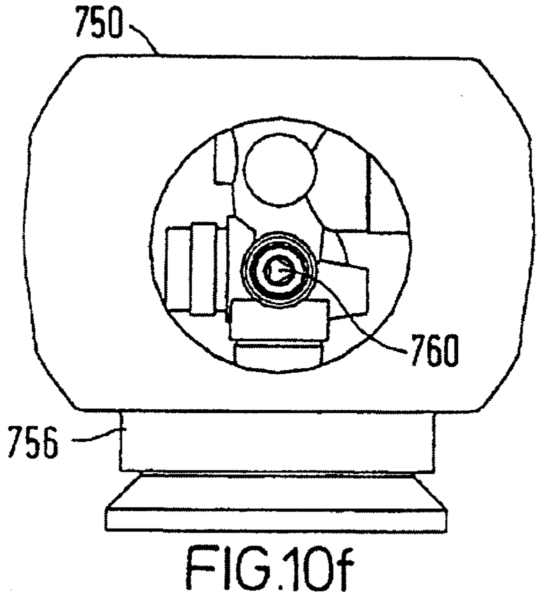
Figure 10G:
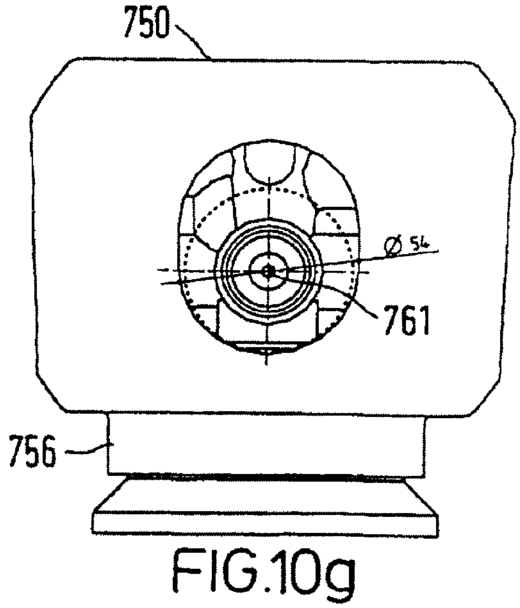

FIG. 6 is a diagrammatic representation of an alternative device modified from that of FIG. 3;

FIGS. 7*a* and 7*b* show respectively a side view and a diagrammatic representation of a gas control device embodying the invention, in which a secondary module is a mixer module with gas source;

FIGS. 8 and 8*a* are diagrammatic representations of an alternative embodiment of the invention for mixing gas, including a second compressed gas cylinder;

FIGS. 9*a* to 9*d* show a series of alternative filling systems which may be used in connection with any of the embodiments set out herein, FIG. 9*d* showing in particular a filling arrangement which embodies one aspect of the invention;

FIGS. 10*a* to 10*m* show respectively: a stack of modules embodying the invention, a single module fastened to the top of a gas cylinder embodying one aspect of the invention, and the internal circuitry of one example of such a module: and ten views of examples of FIG. 10*c;*

FIGS. 11*a* to 11*c* show a series of examples of constructions of components which may be used in connection with embodiments of the invention shown in FIG. 3, and in other Figures of this application.

Figure 1:
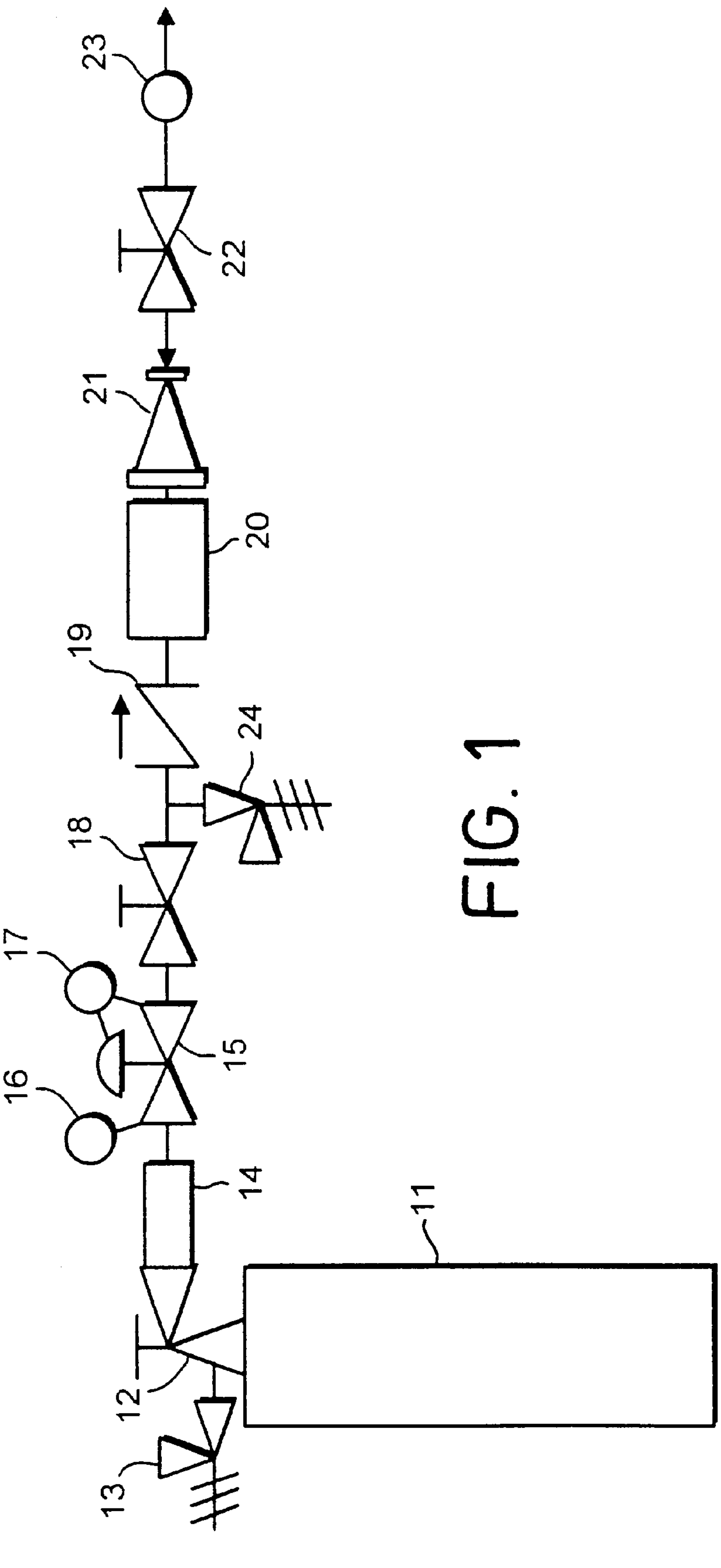
FIG. 1 is a diagrammatic representation of a typical known compressed gas cylinder control system in an industrial application.
Figure 2:
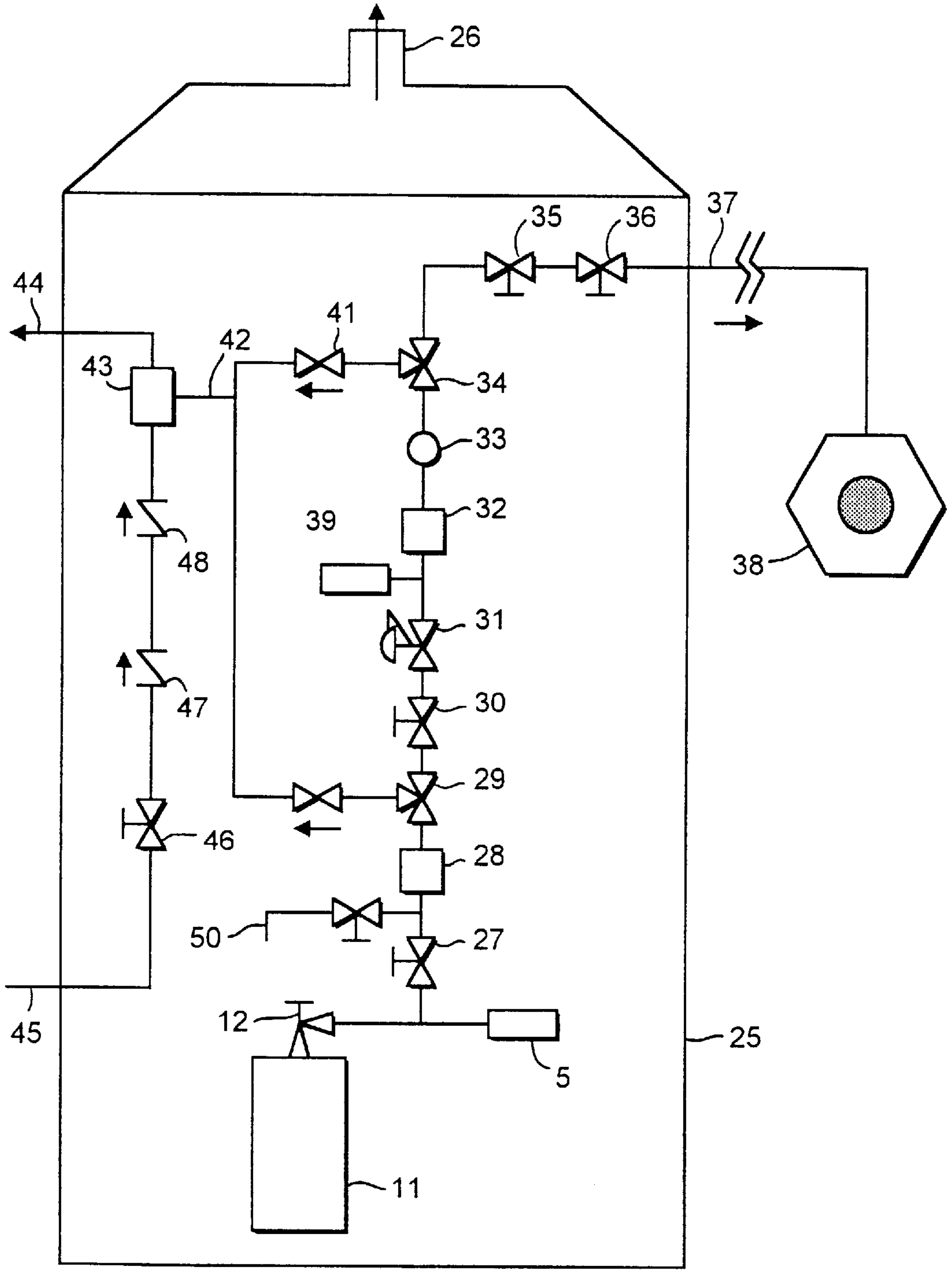
FIG. 2 is a diagrammatic representation of a typical gas cabinet showing the configuration and engineering flow components for a hazardous and/or corrosive gas.

There will first be described two examples of current uses of compressed gas cylinders. FIG. 1 shows a basic set up that is commonly used in research, analytical, medical, educational and some other industrial applications. FIG. 2 shows a typical gas cabinet that is often used in semiconductor manufacturing installations.

In FIG. 1, a compressed gas cylinder 11 has a conventional cylinder valve 12 and rupture disc 13 to provide a safety relief device. A standard coupling 14 to the standards of the Compressed Gas Association is provided at the outlet of the cylinder valve 12, and is coupled to a pressure regulator 15 providing a selected pressure reduction, and having a high pressure gauge 16 and low pressure gauge 17. The cylinder valve 12 and rupture disc 13 are mounted on the cylinder 11, but all subsequent components are mounted off the cylinder and are connected by conventional couplings or welded joints. The gas flow line continues from the pressure regulator 15 through an isolation valve 18, check valve 19, purifier 20, filter 21 and isolation valve 22, to an output 23 connected to the apparatus to utilize the gas. Between the isolation valve 18 and the check valve 19 is provided a low pressure safety release valve 24.

In FIG. 2 a typical gas cabinet 25 provides a ventilated cabinet enclosing the cylinder 11 and the gas control components. The gas cabinet is provided firstly for containment of any catastrophic leak of cylinder contents. The cabinet is exhausted through a central ventilation system at 26. Depending on applications, the ventilation system may include a scrubber system for efficient removal of the cylinder contents before being exhausted to the environment. The second purpose of the gas cabinet is to provide effective gas management by controlling functions such as: pressure, filtration, cylinder level, cycle purging, purification and safety monitoring. The gas cabinet electronic control system provides real time feedback to process tools and operators with information regarding gas utilization, equipment operation, cylinder contents, process gas pressure and safety alarm status.

The gas flow line from the cylinder 11 will now be described, and components corresponding to those in FIG. 1 will be indicated by like reference numerals. The output of the cylinder 11 passes from the cylinder shut-off valve 12 through a control valve 27 and flow switch 28 to a further valve 29. A high pressure transducer 5 upstream of the valve 27 indicates the pressure of the cylinder 11. The output of the valve 29 passes through a further control valve 30 to a pressure regulator 31 for producing a selected pressure reduction. The low pressure output passes through a flow switch 32 and filter 33 to a further valve 34 and thence through further control valves 35 and 36 to an outlet 37 leading to apparatus 38 for using the gas. Between the pressure regulator 31 and the flow switch 32 a low pressure transducer 39 indicates the low pressure in the flow line.

Control valves 40 and 41 lead respectively from valves 29 and 34 to a common pressure line 42 through a venturi pump 43 to a venturi outlet 44. A purge-gas inlet 45 admits nitrogen through valves 46, 47 and 48 to the venturi 43 to allow evacuation of the main flow circuit. The effect of the venturi nitrogen entering at 45 and exiting at 44 is to generate vacuum to remove residual air or contamination out of the main process flow line. Between the valve 27 and flow switch 28 in the main flow path, is connected a valve 49 with a high pressure purge-gas inlet 50 for admitting high pressure ultra high purity nitrogen for purging the main flow line.

During cylinder change from spent cylinder to a full cylinder, the high pressure system must be effectively purged of the process gas. After purging, the high pressure pigtail connection to the cylinder shut-off valve 12 is disconnected from the spent cylinder and a full cylinder connected. The gas panel provides the valving and vacuum assisted purging necessary to effectively clean the pigtail connection. Vac-purge cycling is accomplished by sequentially opening and closing in opposition the valves 49 and 29. In this manner process gas is removed and replaced by the purge-gas, in this case ultra high purity nitrogen, which could be provided from a cylinder source. The gas panel valves are typically automatically controlled via a programmable logic controller or microprocessor. The logic control ensures that the sequencing of valves for cylinder change is consistent and prevents human operator error.

During the connection of the full cylinder, a similar sequencing of these valves removes atmospheric contaminants. Atmospheric contamination poses the greatest risk for inception of corrosion or formation of deleterious reactive by-products which can adversely affect the operation of gas control components downstream. At full cylinder pressure, many important corrosive gases are very sensitive to initiating corrosion by residual atmospheric contaminants. For instance, acid gases, such as HBr and HCl which are delivered as vapors will initiate corrosion when a condensed phase is in contact with a corrodible material. It follows that if the high pressure connection can be eliminated, the sensitivity to atmospheric impurities due to cylinder disconnection and reconnection can be decreased or eliminated.

Turning now to FIG. 3, there is shown in diagrammatic form gas control devices embodying the invention, and arranged to carry out the functions shown in FIG. 2. A first compressed gas cylinder 11 contains process gas, and a second compressed gas cylinder 111 contains purge-gas such as nitrogen. Each cylinder contains a built in purifier, 9 and 109 respectively, arranged in the manner described in U.S. Pat. No. 5,409,526, referred to hereinbefore. The cylinders 11 and 111 each has mounted thereon a modular gas control device comprising a primary module, 52 and 152 respectively. The primary modules are identical, but perform different functions depending upon operation of internal components. Mounted on top of the primary module 152 is a secondary module 252 which in this case is a vacuum module.

Considering initially the primary module 52, this comprises a first supporting body (indicated diagrammatically in FIG. 3 at 54, but indicated more fully in FIG. 5 to be described hereinafter). The supporting body 54 has a first main gas flow path through the body, indicated generally at 55. Input connecting means 56 are provided for mounting the body 54 on the container 11 of compressed gas and connecting the gas flow path 55 to communicate with the gas container 11. The input connecting means 56 comprises a first connecting flow path 57 communicating with the built-in purifier 9 by way of a residual pressure valve 10, and a second connecting flow path 59 communicating directly between the interior of the cylinder 11 and a filling valve 60 in the supporting body 54 of the primary module 52. The filling valve 60 communicates with a filling inlet 61. Also connected to the second flow path 59 is a safety release valve, or rupture disc 62.

The first flow path 57 of the input connecting means 56 connects the cylinder 11 to the main flow path 55 by passing firstly to a main cylinder valve 64. The output of the main cylinder valve 64 is connected to a filter 65 which is connected to a pressure regulator 66 for reducing the pressure from say 200 bar to approximately 0–20 bar. Between the filter 65 and the pressure regulator 66 is connected a high pressure gauge 67. This serves to indicate the pressure in the cylinder 11, and thus to indicate the state of content of the cylinder so that the cylinder can be changed when empty. The outlet of the pressure regulator 66 is connected to a pressure switch or flow switch 68 for controlling the low pressure flow to the process apparatus through an isolation valve 69, leading to a quick connect output connection means 70. The pressure switch or flow switch 68 may for example be a manually operated needle valve or metering valve.

A low pressure gauge 71 is connected to the pressure/flow switch 68 to indicate the pressure in the low pressure portion of the primary module 52. The primary module 52 also has a purge-gas inlet valve 72 communicating with the main flow path 55 via a non-return valve 63 at a position upstream of the pressure regulator 66, at a position between the filter 65 and the cylinder valve 64. The purge-gas valve 72 is connected to a purge-gas inlet means 73 which in the present case is connected to a purge line 74 which will be described more fully hereinafter.

Figure 4:
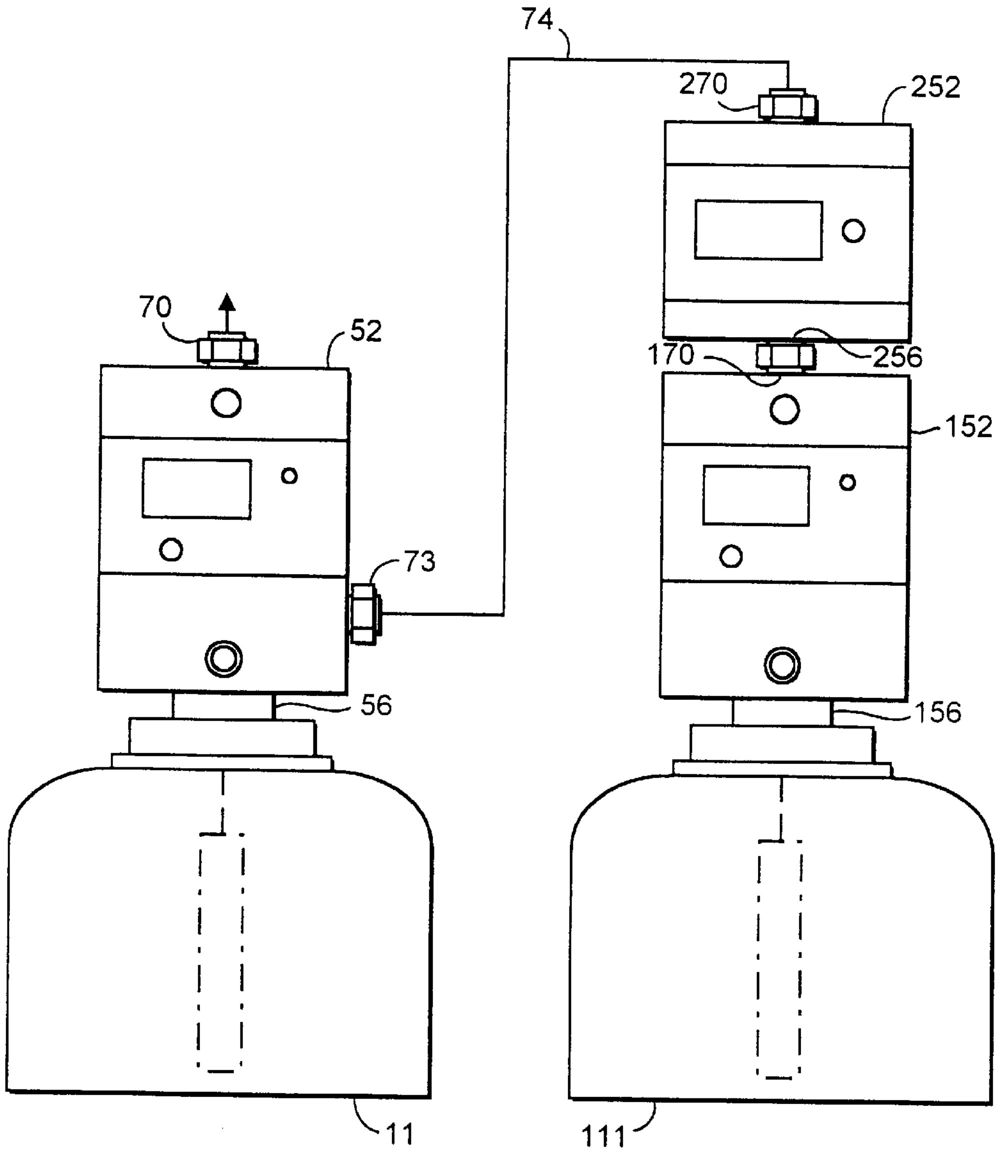
FIG. 4 is a diagrammatic side view of the physical construction of the gas control system of FIG. 3.

FIG. 4 is a diagrammatic representation of a side view of the apparatus shown in FIG. 3.

Turning to FIGS. 5, 5*a*, 5*b* and 5*c* the components of the gas control device 52 are shown in more detail, but in diagrammatic form, in a perspective side view of the device, partly in section. FIGS. 5*b* and 5*c* are 3-dimensional diagrammatical representations of the exterior of the components shown in FIG. 5*a*, with the addition of further components at the base.

The supporting body 54 of the gas control device 52 is shown as a elongate body having a principal axis 51 which is generally coaxial with the axis of the gas cylinder (not shown). The input connection means 56 has an internal bore leading up to the main gas flow path through the body 54, and is externally threaded (not shown) to couple to the conventional threaded opening in the top of the pressure gas cylinder.

The main shut-off valve 64 is operated by a control knob 75. The high pressure transducer or pressure gauge 67 is accessed through a transverse passageway 76. The purge port 73 coupled to the purge-gas valve 72 is positioned on the far side of the device and is not shown in FIG. 5. The low pressure shut off valve 69 is operated by a control knob. The fill port 61 is accessed through a sealable cover, (not shown). The pressure regulator 66 is controlled by a knob 78. The pressure regulator consists of an expansion valve 66. The check valve, which is not shown in FIG. 5, is positioned at the upper end of the main flow path 55 and beyond this is provided the quick-connect output connecting means 70, covered by a removable cover 79. A metal housing 50 surrounds the supporting body 54. A plastic ring 48A is fitted on the top of the housing 50 for absorbing external impact, protecting the connection between primary and secondary modules and handling.

There will now be described the normal operation of the primary module 52, when used as a single gas control device during normal supply of the process gas from the cylinder 11 to the use apparatus (not shown).

In FIG. 3, the purge-gas valve 72 will normally be closed, as will the filling valve 60 and the safety release valve 62. When process gas is required the cylinder valve 64 will be opened, and process gas will be supplied at the outlet connecting means 70, controlled by the adjustable pressure regulator 66 and pressure/flow switch 68, monitored by high pressure gauge 67 and low pressure gauge 71. When the cylinder 11 has become empty, the cylinder will be disconnected at the output connecting means 70 in the low pressure part of the flow path at a pressure in the region of 0–20 bar and at the purging inlet connecting means 73 when valve 72 is closed. The entire unit of cylinder 11 and gas control device 52 will then be returned to the gas supplier for filling. A new, filled, gas cylinder will be provided together with its own primary module 52 (acting as a gas control device) already permanently mounted on the cylinder, the main flow path 55 through the gas control device 52 will be purged (as will be described hereinafter), and the new cylinder and gas control device will be coupled to the use system through the output connecting means 70 of the new gas cylinder and to the purging system through the purging inlet connecting means 73. Thus the make and break will be carried out at a relatively low pressure, in the region of 0–20 bar. The connection between the gas control device 52 and the cylinder 11 is not broken by the user of the gas cylinder. The refilling of the empty cylinder is carried out by the gas supplier after return of the intact cylinder and control device through a sealed entry cap which may not be removed by the user. The filling is carried out by the gas supplier through the fill port 61 and fill valve 60, after appropriate purging.

There will now be described the structure of the remainder of the components shown in FIG. 3. The purge-gas cylinder 111 and the primary module 152 may be of identical construction to the cylinder 11 and primary module 52, and for convenience like components are indicated by like reference numerals with the prefix 1. Mounted on the outlet connecting means 170 of the primary module 152 is the secondary module 252. The secondary module comprises a second supporting body indicated generally at 254, and generally of a similar nature to the supporting body 54 shown in FIG. 5. The secondary module has a main gas flow path 255 through the body and second input connecting means 256 and second output connecting means 270. The supporting body 254 is mounted on and supported by connection between the second input connecting means 256 and the output connecting means 170 of the primary module 152.

The input connecting means 256 is connected along the main gas flow path 255 to a non-return valve 280 and thence to a control valve 281 followed by a control valve 282, the output of which is connected to the output connecting means 270. At the junction between the control valves 281 and 282, there is connected a control valve 283 leading to an input/output connecting means 284, and also a control valve 285 leading through a venturi pump 286 to its vent 287. Between the control valve 285 and the venturi pump 286 is positioned a transducer 288. The inlet connecting means 256 is connected to a further gas flow path passing through a control valve 289 to a non-return valve 290 and thence to the venturi pump 286. The output connecting means 270 is connected by a pressure/vacuum line 74 to the purge-gas inlet 73 of the primary module 52.

All the main input and output connecting means are standardized into two connecting forms. The input connecting means 56 and 156 are made to fit the standard outlet of a pressure gas cylinder. The outlet connecting means 70, 170, and 270 are all of the same construction and are arranged to mate with corresponding input connecting means 256 of any secondary module. The connection between an output connecting means 170 and an input connecting means 256 is arranged to provide structural support for the secondary module mounted thereby, and to provide flow communication between the main gas flow paths of the modules so joined. However, each output connecting means 70, 170 and 270 may also if necessary be connected to a conventional pressure line such as the line 74, in addition to being able to connect to a secondary or a further secondary module. Thus the secondary module 252 may have mounted thereon a further secondary module (not shown).

The operation of the secondary module 252 will now be described in a typical application. Two types of purging are carried out, one of them at relatively high pressure (for example 200 bar) by the gas supplier, and the other at a relatively low pressure (for example 0–20 bar) by the user. The reason is that when the cylinder and its primary module are first assembled there will be air within the cylinder. Even if the cylinder is vacuum purged, this will not remove all contamination from the outlet components so that if the cylinder were filled with a corrosive or flammable gas and allowed to emerge through the outlet path the residual air or moisture in it would react and degrade the component. Therefore a first, high pressure, form of purging is carried out at the very initial stage as the cylinder is being assembled for the first time with the pressure control device. High pressure purging is also carried out by the gas supplier on the primary module upon refilling the cylinder. This high pressure purging is carried out by connecting the purge-gas valve 72 to a source of high pressure purge-gas (not shown) which is then purged through the primary module 52. This is carried out only by the gas supplier and not by the customer.

A first form of low pressure purging, by the user, is shown in FIG. 3, where the secondary module 252 is intended to carry out a low pressure purge of the primary module 52, upon installation of a refilled cylinder 11. Initially in the secondary module 252 valve 281 is closed, and valves 289 and 285 are opened so that the purge-gas from the cylinder 111 passes out through the venturi pump 286 and the venturi vent 287 and produces a vacuum upstream of the valve 282. When the valve 282 is opened, vacuum purging of the primary module 52 takes place by way of the purge line 74. After the vacuum purging, the venturi vent circuit valves 285 and 289 are closed and the valve 281 in the main flow path through the secondary module is opened. Purge-gas from the cylinder 111 is then passed at low pressure through the purge line 74 to provide a low pressure purge. The purge line 74 is cleaned via this vac/purge cycle. Valve 72 is opened to provide a low pressure purge of the primary module 52.

An alternative form of low pressure purging is illustrated in FIG. 6, which is a modification of the arrangement of FIG. 3. The cylinders 11 and 111, and the primary modules 52 and 152 are the same in FIGS. 6 and 3. The purge-gas cylinder 111 has no secondary module mounted thereon, and the process gas primary module 52 has a secondary module 352 mounted thereon, having a different internal valve arrangement from the secondary module 252. The purpose of the alternative purging arrangement of FIG. 6 is to avoid the need for a venturi purge.

Considering the structure and connections of the arrangement of FIG. 6, the secondary module 352 has its input connecting means 356 connected to its output connecting means 370 along a main gas flow path 355 through two control valves 380 and 382. The junction between the valves 380 and 382 is connected firstly through a control valve 393 to a purge-gas inlet 394, and is connected also through a control valve 395 to port 396. The purge-gas inlet 394 is connected by a purge-gas line 78 leading from the outlet connecting means 170 of the primary module 152. The outlet means 370 of the secondary module 352 is connected by process gas line 79 to the process apparatus (not shown). When replacing an empty cylinder 11 in the arrangement of FIG. 6, the make and break is made between the output connecting means 70 of the primary module 52, and the input connecting means 356 of the secondary module 352. When the new filled cylinder is provided, the primary module 52 has been high pressure purged by the gas supplier, and is supplied filled with high pressure purge-gas. The new cylinder is connected to the input connection 356 and low pressure purge-gas is supplied along the purge-gas line 78 to purge the secondary module 352 and the connection between module 52 and module 352. After the purging, the purge-gas valve 393 is closed and the high pressure purge-gas in the primary module 52 is forced through the secondary module 352 by opening the main cylinder valve 64 to admit high pressure process gas to the primary module. The advantage of the alternative method shown in FIG. 6 is that the possibility of contamination during the venturi purge is avoided.

FIGS. 7*a* and 7*b* show two views of a gas cylinder 111 with primary module 152 and a different secondary module 452 for carrying out a mixing function. In FIG. 7*a* the assembly is shown diagrammatically in a 3-dimensional side view and in FIG. 7*b* the flow paths and components are shown. The cylinder 111 and primary module 152 are identical to that shown in FIG. 3 and like reference numerals are used.

The secondary module 452 has an inlet connecting means 456, a main flow path 455 leading to an output connecting means 470. The input connecting means 456 is connected to a flow control valve 401 the output of which is connected firstly to a mixer valve 402 and secondly to the input of a vapor source 403. The output of the vapor source 403 is also connected to the mixer valve 402. The output of the mixer valve 402 is connected to the output connecting means 470, which is in turn connected to the process apparatus along a process gas line 479. The source 403 is a small mixture generator which could be a diffusion tube or a permeation tube. When the process gas from the cylinder 111 is passed through the gas source 403 there is generated a mixture of the second gas and the process gas which may be adjusted by the flow control valve 401 to give a mixture which may be a fine mixture of the order of parts per million of the second gas, or a percentage mixture of the components to add to the gas stream. In this case the process gas from the cylinder 111 constitutes a zero reference gas and the switching arrangement in the module 452 allows the provision to the process apparatus of either zero reference gas directly from the cylinder 111 or the selected mixture. The zero reference gas must be available to the process line for calibration purposes. The source 403 may conveniently be a tube with active chemicals sealed in it in gaseous or liquid form with a semipermeable membrane through which the material can permeate or diffuse relatively slowly into the gas stream from the cylinder Thus to summarize, the secondary module 452 provides two pathways. One will allow gas to pass straight from the cylinder to the output connecting means 470, and the second pathway will pass the gas through the source device 403. The amount of vapor added from the source 403 is determined by the flow rate set at the flow control 401 and the vapor pressure of the source, which depend upon the geometry of the device and temperature of the source.

FIG. 8 show an alternative mixing arrangement in which two process gases are provided in cylinders 11 and 511. Each of these cylinders has mounted thereon a primary module indicated at 52 and 552, the primary modules being identical with the module 52 shown in FIG. 3. On top of the module 552 is a secondary module 553 for mixing gases from the two cylinders. As shown in the inert in FIG. 8 the secondary module 553 has a first input connecting means 556 by which the module 553 is mounted on the primary module 552, and a second gas inlet at 584. The secondary module 553 is formed by a supporting body indicated generally at 554 which has two flow paths through it leading respectively from the gas inputs 556 and 584 to an output connecting means 520 which is connected by a process gas line 579 to a use apparatus (not shown).

The main gas flow path 555 leads from the inlet connecting means 556 through a variable valve 510 and a filter 511 to a flow meter 512 and thence to a mixing valve 513. The outlet of the mixing valve 513 is connected to the output connecting means 520. The second gas inlet 584 is connected through a variable valve 514, filter 515, flow meter 516 to the mixing valve 513. The gas inlet 584 is connected by a gas line 530 to the output connecting means 70 of the primary module 52. In operation, the gases from the two cylinders 11 and 511 can be mixed in a desired ratio by operation of the variable valves 510 and 514. Compared with the method described with reference to FIGS. 7*a* and 7*b*, this arrangement is more suitable for making mixtures at percentage levels for example making a two component mixture of argon and hydrogen when 10% hydrogen is desired in the argon-hydrogen mix. The arrangement of FIG. 8 allows the provision of two individual cylinders, for example of hydrogen and argon, for mixing. This method is also suitable for making ppm or ppb mixture if one of the cylinders contains a suitable mixture and the other contains the balance gas.

In a modification of a primary module (not shown) the module may include other control and sensing devices, and for example a microchip connected to a transmitter communicating with a remote control station so that switching functions within the primary module may be carried out under remote control.

As has been mentioned, the components within the modules may be produced by the techniques of micro electromechanical systems, for example as set out in the document mentioned in the introduction, "A Revolutionary Actuator For Microstructures", SENSORS, February 1993. Micro mechanical devices and systems are inherently smaller, lighter, faster and usually more precise than their macroscopic counterparts. In addition MEMS technology will reduce the cost of functional systems relative to conventionally machined systems, by taking advantage of silicon processing technologies similar to those used in integrated circuits. The development of such systems enables: the definition of small geometry, precise dimensional control, design flexibility, and interfacing with control electronics. The technology may use micromachined silicon, where a range of different sensors can be used, such as pressure, position, acceleration, velocity, flow, and force.

There will now be described with reference to FIGS. 9*a* to 9*d*, together with the preceding drawings, a further aspect of the invention concerned with the provision of a filling circuit in a gas control device, whether or not this device is suitable for use in a modular system. FIG. 9*a* shows a known system. FIG. 9*d* shows a filling system embodying this aspect of the invention, and corresponds to the system shown in FIG. 3, and other earlier Figures. Components corresponding to those found in earlier Figures are numbered with similar reference numerals, but commencing with the reference numeral 6. The filling systems shown in FIGS. 9*a* to 9*d*, will be referred to respectively as systems A to D.

Components which are common in FIGS. 9*a*, 9*b*, 9*c* and 9*d* are as follows. A cylinder 611 is connected by a first connecting path 657 to a cylinder top gas control device having a supporting body 654 indicated diagrammatically. The supporting body 654 is supported on the cylinder 611 by input connecting means indicated diagrammatically at 656. The supporting body 654 has a main gas flow path through the body indicated generally at 655. The input connecting means 656 are provided for mounting the body 654 on the container 611 of compressed gas and connecting the gas flow path 655 to communicate with the gas container 611. Filling is carried out through the input connecting means 656, through a filling inlet 661. In each case filling is carried out through a filling valve. In systems A, B and C the filling valve is a check valve 608, and in system D the filling valve is a high pressure shut-off valve 660. The gas control device has an output connecting means 670 for connecting to usage apparatus. The main gas flow path 655 leads from the input connecting means 656 to the output connecting means 670, through the main shut-off valve 664 and a pressure regulator 666 for reducing the pressure from say 200 bar to approximately 0–20 bar. Other components may be provided, generally as shown in FIG. 3 and other Figures of this application.

Considering again the known filling system shown in FIG. 9*a*, there are three problem factors with this conventional filling arrangement for a cylinder top assembly including a pressure-reducer. In these assemblies the fill port 661 communicates with the usage circuit between the high pressure shut-off valve 664 and the pressure-reducer 666. The fill port 661 is closed in normal use by a non-return valve 608, through which filling takes place. The three requirements are:

(i) to protect the pressure regulator during the filling operation;

(ii) to be able to add a functional element such as a BIP (built-in purifier) filter or non-return valve to the outlet of the gas cylinder in normal use, and still to be able to fill through the assembly; and (iii) To have the gas cylinder positively sealed by shut-off valves at all exits when not in use (without the need for operating two shut-off valves during filling).

Figure 9C:
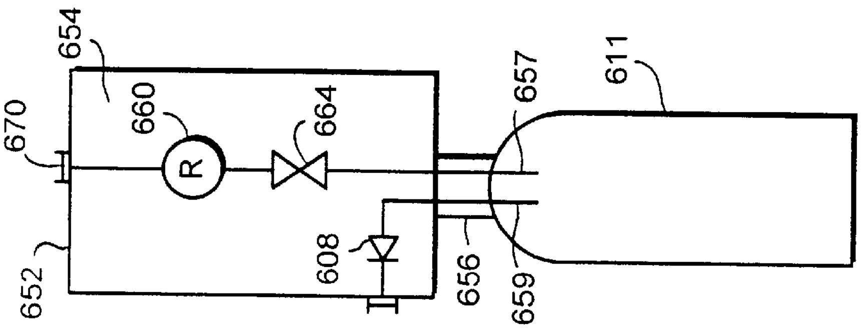
Figure 9B:
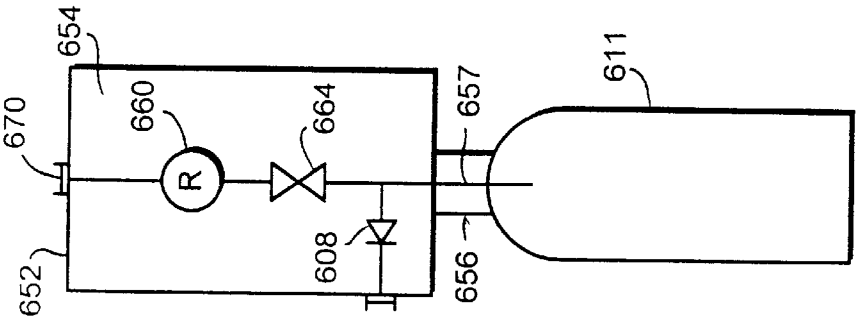
Figure 9A:
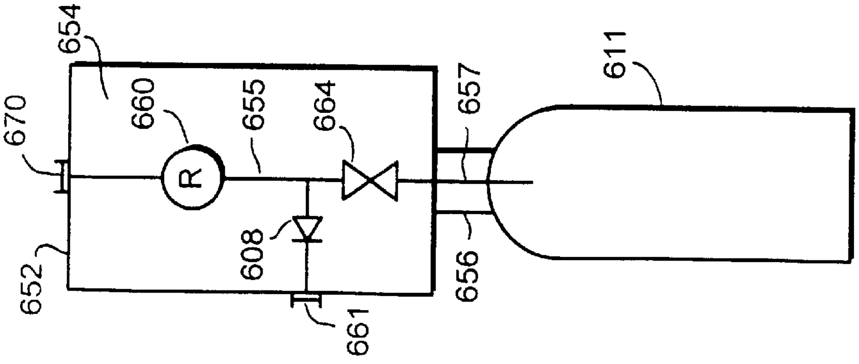

As shown in FIGS. 9*b* and 9*c*, various combinations are possible which achieve some of these requirements but the only arrangement which fulfils all these requirements is the one shown in FIG. 9*d*.

Referring now in more detail to the four filling systems, first in FIG. 9*a*, system A is a known filling arrangement used in medical and helium cylinder supply systems. Filling is through the check valve 608 which joins the main flow path 655 between the shut-off valve 664 and the pressure reducer 666. The advantage is that the shut-off valve 664 keeps the high pressure isolated from the system and the operator until it is in use. The check valve 608 is used in the filling circuit, but this does not have to contain the high pressure during non-use of the system, since this is dealt with by the shut-off valve 664. The disadvantage of system A is that during filling of the cylinder 611 the pressure reducer 666 is exposed to the high filling pressure.

In system B of FIG. 9*b*, the filling circuit joins the main flow path 655 upstream of the shut-off valve 664. The disadvantage is that the check valve 608 in the filling circuit is always exposed to the full pressure from the cylinder 611, whether or not the cylinder is in use. Closure of the shut-off valve 664 does not completely seal the cylinder 611, so that there is some possibility of leakage through the check valve 608.

In FIG. 9*c* the system is generally as shown in FIG. 3, except that a check valve or non-return valve 608 is shown in place of the shut-off valve 60 in the filling circuit of FIG. 3.

In FIG. 9*d* there is shown system D which is the preferred system in accordance with the invention. There is a totally separate filling circuit, with a shut-off valve 660 instead of the check valve 608 in the filling circuit. This provides an inventive feature independently of modularity. The improvement here is the combination of a separate filling circuit with a shut-off valve in the filling circuit instead of the check valve. This gives the ability to fill with only one valve to be operated, and complete sealing of the cylinder when not in use by the two shut-off valves.

It is to be appreciated that any of the systems of filling shown in FIGS. 9*a* to 9*d*, can be used with other features of the invention such as modularity, to provide embodiments of the invention in one or more aspects of the invention.

A particularly preferred form of the arrangement shown in FIG. 9*d*, is the arrangement shown in FIG. 3, and other Figures, in which a built-in purifier 9 is provided inside the cylinder 11, connected to the first connecting flow path 57, through the pressure retention valve 10. There will now be set out a number of advantages of various aspects of the invention.

The combination of the shut-off valve in the filling circuit, and the pressure regulator on the cylinder, provides a number of advantages. The built-in purifier can purify gas to a standard of ppb (parts per billion) of impurities, or even ppt (parts per trillion), which cannot be achieved by previous filters. In the conventional way, the purified gas reaches the tool in the usage circuit by passing through a series of discrete flow control components which are connected to each other via valves and fittings. This type of arrangement will inevitably introduce large surfaces contacting the gas, leaks, and dead spaces, which will re-contaminate the purified gas. Directly placing a pressure regulator above the built-in purifier in a cylinder head mounted gas control device, with minimized volume and the least number of connections in the downstream path from the built-in purifier, is an effective way to minimize contamination.

A built-in purifier can also filter particles to achieve a very high specification of cylinder gases, which has not normally been available in known cylinder gas products. Fittings in gas flow circuits often generate particles. For this reason the concept of directly combining a pressure regulator with a built-in purifier without any joints reduces particle generation.

Although the built-in purifier can remove particles effectively, particles may be generated downstream when high pressure gas suddenly expands through a restrictor, such as a shut-off valve. The use of a pressure regulator in combination with a built-in purifier reduces the output pressure and will avoid some particle problems and make particle measurement much easier.

Some corrosive gases are less corrosive to the gas delivery system at a lower pressure. The built-in purifier can remove moisture to reduce the corrosivity of the gas and the pressure regulator can reduce the outlet pressure to further reduce the corrosiveness.

In this application, by purifying means is meant means for removal of gaseous and/or solid impurities. Similarly the term purifier or built-in purifier indicates purifying means for the removal of gaseous and/or solid impurities. Conveniently this can be achieved by adsorbents, absorbents, catalysts, and/or filtering media, and/or mixtures thereof.

There will now be described with reference to FIGS. 10*a* and 10*b* a modification of the outlet connecting means of a modular gas control device embodying the invention. In the embodiments described hereinbefore, preferred arrangements have been described in which for each module the main gas flow path is aligned for at least part of its length along a principal axis of the supporting body, which principal axis extends through the input connecting means and the output connecting means of the module. A preferred feature has also been described in which the output connecting means of a module is positioned on or at an upper face of the primary module for mounting a secondary module above the primary module. However in some circumstances it may be preferable that the top module of a series of modules should have its low pressure outlet from a side port rather than a top port. The advantage of this is to avoid entry of contaminants when the outlet means is unconnected to a usage circuit, especially in industrial applications. Thus in accordance with an alternative preferred form, the outlet means of each of a series of modules stacked one on top of the other is provided for each module on or at an upper face of the module, except for the uppermost module when the outlet means is provided on a side face of the module.

In FIG. 10*a* there is shown a cylinder 11 on which are mounted two consecutive modules 752A and 752B. In each case the output connecting means of the module, 770A and 770B respectively, is positioned on or at the upper surface of the module, coaxial with the axis of the cylinder 711. For the last module shown, 752C, the output connection means 770C is positioned on or at a side face of the module. Typically, the first module 752A will include a pressure regulator and will be generally as shown at 52 and 152 in FIG. 3. Such a regulator module may be provided with a output connection means 770A on the upper surface as shown in FIG. 10*a*, or may be provided with an output connection means 770C on a side face, as shown in FIG. 10*b*. Conveniently the two modules shown in FIGS. 10*a* and 10*b*, 752A and 752D can be made from a common forging. The outlets can be machined either on the upper surface or on a side surface, so as to give the two forms of outlet indicated in FIGS. 10*a* and 10*b*. Thus a pressure regulator module may have two types of outlet, vertical and horizontal, to be used differently depending upon its applications. The vertical outlet version is the module to be connected to at least one more module in a vertical stack. The horizontal outlet version is for a module which is to be the last module, such as industrial or medical integrated valve where the only module will be a pressure regulator module.

In FIG. 10*c* there is shown diagrammatically the internal circuitry of a typical cylinder top module such as shown in FIG. 10*b*. In FIG. 10*c*, the components shown correspond to the components in the device 52 in FIG. 3. Corresponding components are indicated by like reference numerals, but with the numeral 7 added before the reference numeral. The difference between the embodiment of FIG. 10*c* and that of FIG. 3, is that the outlet means 70 of FIG. 3 has been moved from an upper surface of the body 54, and is shown in FIG. 10*c* as outlet means 770 positioned on a side face of the body 754.

Most preferably the outlet means 770 faces sideways relative to the module, preferably facing in a horizontal direction. As has been explained, the advantage is that, especially in industrial situations, the outlet means 770 is less likely to be contaminated by falling contaminants, if it is mounted in a side face of the unit, facing sideways, rather than in a top face, facing upwardly.

In examples of the embodiment of FIG. 10*c* the pressure regulator may be a fixed regulator 766 or variable pressure regulator. The purge gas circuit 773, 772 and 763 is optional and may be entirely omitted. Similarly the isolation valve 769 is optional and may be entirely omitted. Where included, the valve 769 may be a shut-off valve as shown or may be a needle valve acting as a flow control valve rather than a shut-off valve.

FIGS. 10*a* to 10*m* show respectively: a stack of modules embodying the invention (FIG. 10*a*); a single module fastened to the top of a gas cylinder embodying one aspect of the invention (FIG. 10*b*); the internal circuitry of one example of such a module (FIG. 10*c*); and ten views of examples of the module shown in FIG. 10*c*. The ten views consist of the views shown in FIGS. 10*d* to 10*m*. The views in FIG. 10*d* to 10*i* relate to one example of the device shown in FIG. 10*c*, and FIGS. 10*j* to 10*m* show a second example of the device shown in FIG. 10*c*.

Figure 10I:
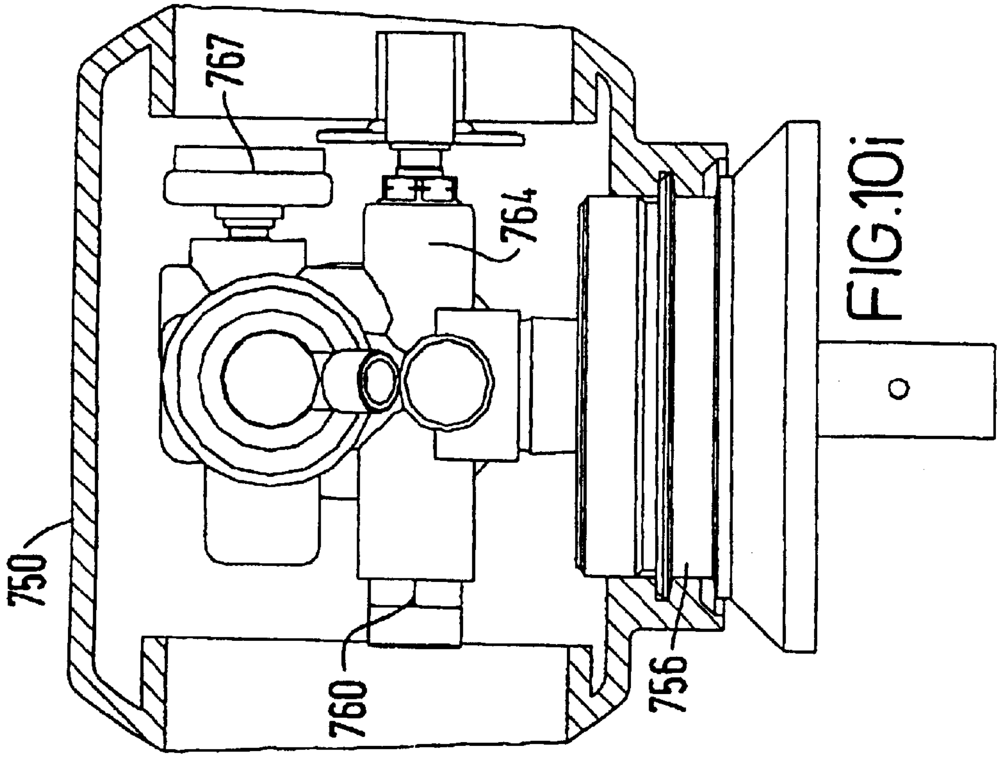
Figure 10H:
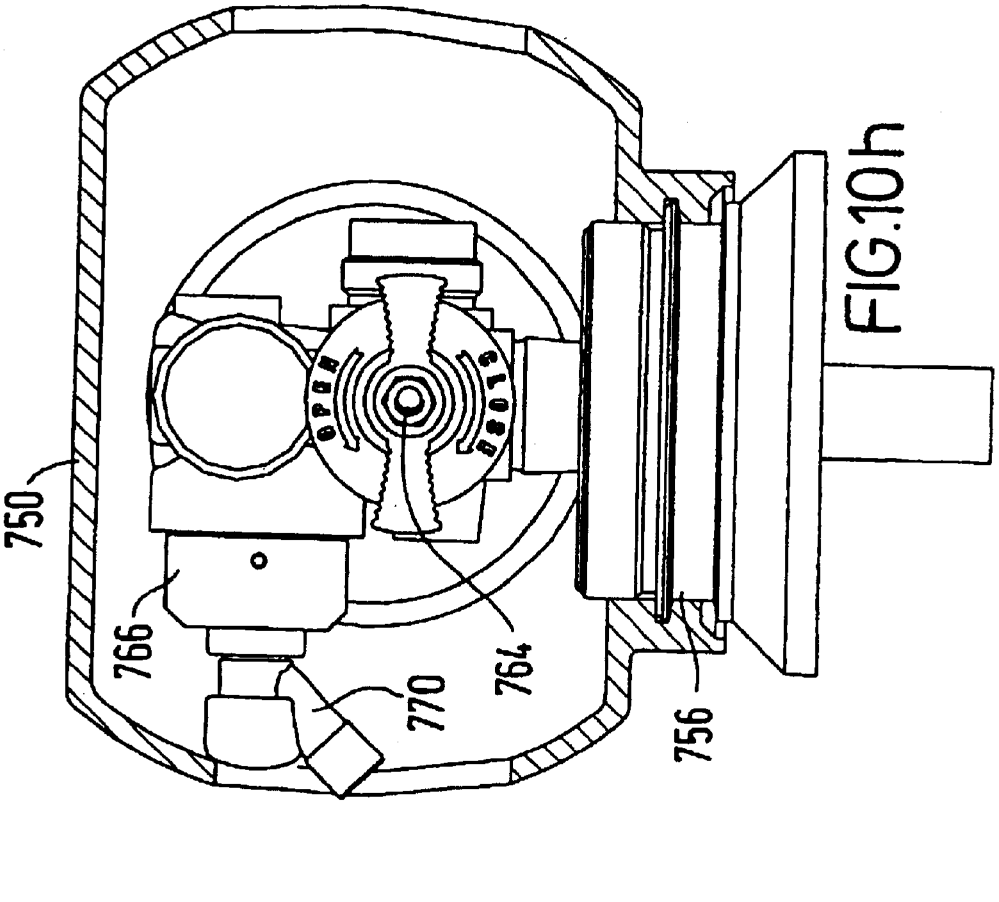
Figure 10J:
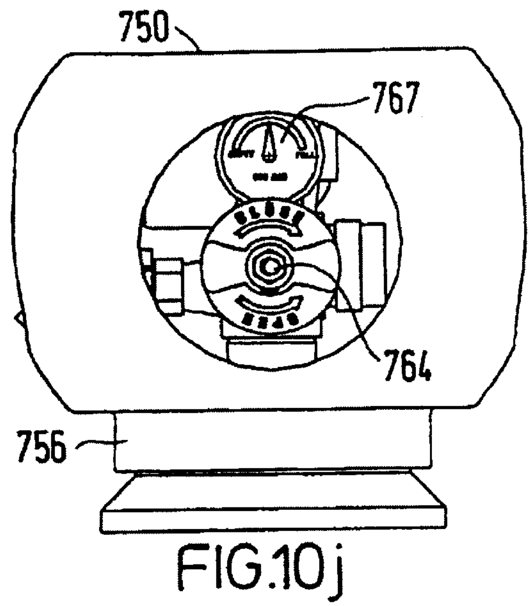
Figure 10K:
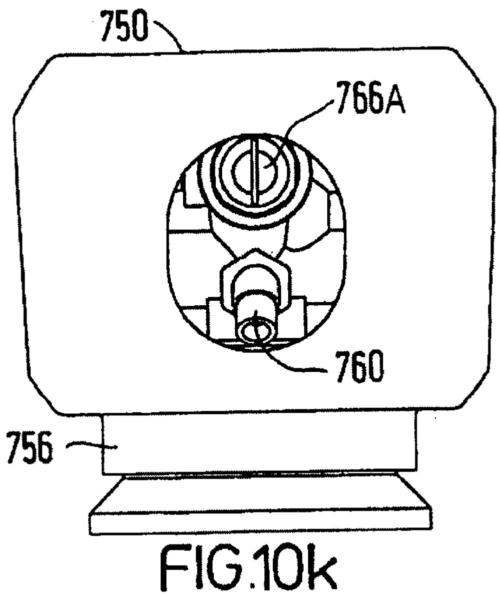
Figure 10L:
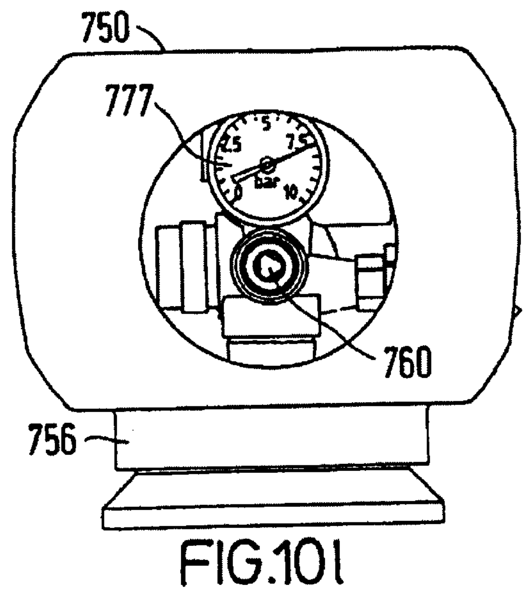
Figure 10M:
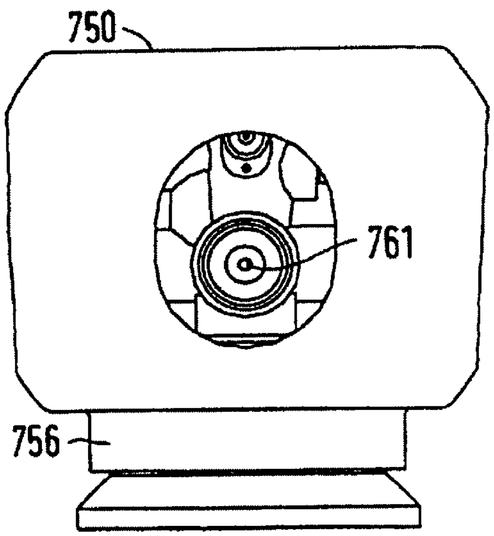

Referring first to FIGS. 10*d* to 10*g*, there are shown four orthogonal side views of one example of the cylinder top device of FIG. 10*c*. In this example five functions are provided in the gas control device 752, namely the shut-off valve 764, the contents gauge 767, the outlet connection 770, the pressure regulator 766, and the filling inlet 761. FIGS. 10*h* and 10*i* show partly sectioned views corresponding to those of FIG. 10*d* and FIG. 10*e*. As can be seen, the device includes a housing 750 surrounding the main supporting body of the device and spaced therefrom, the housing having a number of openings allowing access to, or viewing of, various components which carry out the functions listed. Conveniently the housing 750 may be shaped to provide means for handling the gas container to which the device is connected at the inlet connecting means 756. (The handle and gas cylinder are not shown in FIGS. 10*d* to 10*m*). The significance of FIGS. 10*d* to 10*i*, is that there is shown a convenient arrangement of components to allow access to and viewing of the components performing five functions, through four orthogonal holes or openings in the housing 750. It will be appreciated that the example shown in FIG. 10*d* to 10*i*, is one in which certain components of FIG. 10*c* may be omitted, for example the purge gas circuit 773, 772 and 763.

FIGS. 10*j* to 10*m* show four orthogonal side views of another example of the device of FIG. 10*c*. In these Figures, there are also provided in the example an adjustable pressure regulator 766A having a manually operable lever to give adjustment of pressure; and a low pressure, outlet, gauge 771 (777 in FIG. 10*l*) which can be used to indicate flow. Thus FIGS. 10*j* to 10*m* show how to arrange components giving seven functions in a cylinder top device, so that the components can be accessed or viewed, through four orthogonal ports.

There will now be described with reference to FIGS. 11*a* to 11*e*, examples of components shown in previous Figures by diagrammatic symbols.

In FIG. 11*a*, there is shown a diagrammatic representation of one example of the pressure regulator 66 shown in FIG. 3, also referred to as pressure reducing means, and also referred to as a pressure expansion valve. The example in FIG. 11*a* is a pressure regulator 886 having an inlet passage 880 and an outlet passage 881. High pressure gas entering the passage 880 passes through a central aperture in a piston 882 to a chamber 883 and thence to a restrictor 884. The pressure in the chamber 883 determines the position of piston 882. If the pressure in the chamber 883 rises above the required pressure, the piston 882 is moved to the right in the Figure against a spring 885 and restricts the gap through which the gas passes from the inlet passage 880. The example shown in FIG. 11*a* is a fixed pressure reducer, although in other examples there may be a manually adjustable pressure reduction.

In FIG. 11*b*, there is shown a diagrammatic representation of one example of the shut-off valve 64 shown in FIG. 3, also referred to as the main cylinder valve, and as a high pressure shut-off valve. The component of FIG. 11*b* may also be used, with appropriate modifications, to provide the filling valve 60, the isolation valves 69, and the control valve 281, 282, 285 and 289, also shown in FIG. 3.

In the example shown in FIG. 11*b*, a shut-off valve 864 has an inlet passage 890 for high pressure gas and an outlet passage 891. A movable valve member 892 is movable to the left in the Figure to close the valve, and to the right in the Figure to open the valve, under the control of a manually operable spindle 893.

In this application, by a shut-off valve is meant a controllable valve having an open state and a closed state and having control means for changing the valve between the states.

FIG. 11*c* is a diagrammatic representation of one example of the non-return valve 63 shown in FIG. 3. The example shown in FIG. 11*c* may also be used, with appropriate modifications, to form the non-return valves 280 and 290 in FIG. 3.

In the example shown in FIG. 11*c*, a non-return valve comprises an inlet passage 895 leading past a movable valve member 896 to an outlet passage 897. The movable valve member is supported on a diaphragm 898 and is shown in the Figure in the open position when high pressure gas in the inlet passage 895 holds the valve member 896 against the pressure of the diaphragm 898, away from the valve seat 899. When the pressure in the inlet passage 895 falls below a predetermined level, the diaphragm 898 biases the movable valve member 896 against the seat 899 to close the valve.

It will be appreciated that in general where similar components are shown in other embodiments, the examples given in FIGS. 11*a* to 11*c* may be used.

What is claimed is:

1. A gas control device for use with a cylinder of compressed gas comprising a body adapted to be directly mounted onto said cylinder, said body having therein:

a main gas flow path through the body said path having a high pressure gas delivery inlet and a low pressure gas delivery outlet;

a high pressure gas filling path through the body, said path having a high pressure gas filling inlet and a high pressure gas filling outlet and being discrete from the said main gas flow path, input connecting means for mounting and supporting the body on a cylinder of compressed gas and connecting the cylinder to the said body with both the high pressure gas delivery inlet and the high pressure gas filling outlet separately communicating with the gas cylinder to allow flow of gas from the cylinder into the said high pressure gas delivery inlet or flow of gas from the high pressure gas filling outlet into the cylinder;

pressure reducing means in the main gas flow path for providing at the said low pressure gas delivery outlet gas at a selected pressure substantially lower than that in the cylinder;

output connecting means communicating with the said low pressure gas delivery outlet;

a high pressure gas main flow path shut-off valve in the main gas flow path upstream of the pressure reducing means to selectively open and sealingly close said flow path; and a high pressure gas filling flow path shut-off valve in the high pressure gas filling flow path to selectively open and sealingly close said flow path.

2. A gas control device for use with a cylinder of compressed gas comprising a body adapted to be directly mounted onto said cylinder, said body having therein:

a main gas flow path through the body, said path having a high pressure gas delivery inlet and a low pressure gas delivery outlet;

a high pressure gas filling path through the body, said path having a high pressure gas filling inlet and a high pressure gas filling outlet and being discrete from the said main gas flow path, input connecting means for mounting and supporting the body on a cylinder of compressed gas and connecting the cylinder to the said body with both the high pressure gas delivery inlet and the high pressure gas filling outlet separately communicating with the gas cylinder to allow flow of gas from the cylinder into the said high pressure gas delivery inlet or flow of gas from the high pressure gas filling outlet into the cylinder;

pressure reducing means in the main gas flow for providing at the said low pressure gas delivery outlet gas at a selected pressure substantially lower than that in the cylinder;

output connecting means communicating with the said low pressure gas delivery outlet;

a high pressure main gas flow path shutoff valve in the main gas flow path upstream of the pressure reducing means to selectively open and sealingly close said flow path;

a high pressure gas filling flow path shut-off valve in the high pressure gas filling flow path to selectively open and sealingly close said flow path;

a purge gas flow path having a purge gas inlet and communicating with the main gas flow path between the high pressure main gas flow path shut-off valve and the pressure reducing means for admitting purge-gas to the main gas flow path; and a purge-gas shut-off valve to sclectively open and scalingly close solid purge-gas flow path.

3. A modular gas control device for use with a cylinder of compressed gas comprising a discrete primary module adapted to be directly mounted onto said cylinder, said primary module comprising a body having therein:

a main gas flow path through the body, said path having a high pressure gas delivery inlet and a low pressure gas delivery outlet;

a high pressure gas filling path through the body, said path having a high pressure gas filling inlet and a high pressure gas filling outlet;

input connccting means for mounting and supporting the body on a cylinder of compressed gas and connecting the cylinder to the said body with both the high pressure gas delivery inlet and the high pressure gas filling outlet communicating with the gas cylinder to allow flow of gas from the cylinder into the said high pressure gas delivery inlet or flow of gas from the high pressure gas filling outlet into the cylinder;

pressure reducing means in the main gas flow path for providing at the said low pressure gas delivery outlct gas at a selected pressure substantially lower than that in the cylinder;

a high pressure main gas flow path shut-off valve in the main gas flow path upstream of the pressure reducing means to selectively opcn and sealingly close said flow path, and a high pressure gas filling flow path valve in the high pressure gas filling flow path to open and close said flow path, and output connecting means communicating with the said low pressure gas delivery outlet and adapted to dirctly mount on the primary module a discrete secondary module having a gas flow path inlct with the primary module low pressure gas delivery outlct in communication with said secondary module gas flow path inlet.

4. A devicc according to claim 3 in which the primary module body comprises thercin a purge-gas flow path having a purge gas inlet and communicating with the primary module main gas flow path upstream of the pressure reducing means for admitting purge-gas to the primary module main gas flow path and a purge-gas valve to open and close said purge-gas flow path.

5. A device according to claim 3 in which the high pressure filing path is discrete from the main gas flow path.

6. A device according to claim 3 in which the high pressure gas delivery inlet is common to the high pressure gas filling outlet and the main gas flow path and the high pressure filling path have a common path to a location upstream of the pressure reducing means.

7. A device according to claim 3 in which the high pressure gas filling valve is a shut-off valve to selectively open and sealingly close the high pressure gas filing path.

8. A device according to claim 3 in which the primary module body comprises therein a purge-gas flow path having a purge gas inlet and communicating with the main gas flow path between the main gas flow path shut-off valve and the pressure reducing means for admitting purge-gas to the main gas flow path and a purge-gas valve to open and close said purge-gas flow path.

9. A modular gas control device for use with a cylinder of compressed gas comprising a discrete primary module adapted to be directly mounted onto said cylinder; and a discrete secondary module directly mounted on the primary module;

the primary module comprising a body having therein:

a main gas flow path through the body, said path having a high pressure gas delivery inlet and a low pressure gas delivery outlet, a high pressure gas filling path through the body, said path having a high pressure gas filling inlet and a high pressure gas filling outlet, input connecting means for mounting and supporting the body on a cylinder of compressed gas and connecting the cylinder to the said body with both the high pressure gas delivery inlet and the high pressure gas filling outlet communicating with the gas cylinder to allow flow of gas from the cylinder into the said high pressure gas dclivery inlet or flow of gas from the high pressure gas filling outlet into the cylinder, pressure reducing means in the main gas flow path for providing at the said low pressure gas delivery outlet gas at a selected pressure substantially lower than that in the cylinder, output connecting means communicating with the said low pressure gas delivcry outlet, a high pressure main gas flow path shut-off valve in the main gas flow path upstream of the pressurc reducing means to selectively open and sealingly close said flow path, a high pressure gas filling flow path valve in the high pressure gas filling flow path to open and close said flow path, a purge-gas flow path having a purge gas inlet and communicating with the main gas flow path between the high prcssure main gas flow path shut-off valve and the pressure rcducing means for admitting purge-gas to the main gas flow path and a purge-gas valve to open and close said purge-gas flow path; and said secondary module comprising a body having therein:

a main gas flow path through the body, said path having a gas delivery inlet and a gas delivery outlet, input connecting means co-operating with the primary module output connecting means to directly mount the secondary module body on thc primary module with the secondary module gas delivery inlet communicating with the primary module low pressure delivery outlet to allow flow of low pressure gas from the primary to the secondary module, output connecting means communicating with the said secondary module gas dclivery outlet, and a combination of at lest two functional components for carrying out functions relating to gas flow through the secondary module.

10. A device according to claim 9 in which the said at least two functional components are selected from the group consisting of means for measuring gas flow, means for varying parameters of gas flow, means for switching gas flow, means for venting gas flow, means for mixing gas flow, and means for any combination of said functions.

11. A device according to claim 9 in which the primary module high pressure filling path is discrete from the primary module main gas flow path.

12. A device according to claim 9 in which the primary module high pressure gas delivery inlet is common to the primary module high pressure gas filling outlet and the primary module main gas flow path and the primary module high pressure filling path have a common path to a location upstream of the primary module pressure reducing means.

13. A device according to claim 9 in which the high pressure gas filling valve is a shut-off valve to selectively open and sealingly close the high pressure gas filing path.

14. A device according to claim 9 in which the purge gas valve is a shut-off valve to selectively open and sealingly close the purge gas flow path.

15. A device according to claim 9 in which the secondary module is a vacuum module comprising therein a vent port and switchable valve means for selectively redirecting gas flow from the secondary module gas delivery inlet to vent through the vent port producing a vacuum at the secondary module gas delivery outlet for evacuating apparatus connected to the secondary module output connecting means.

16. A device according to claim 9 in which the secondary module output connecting means is connected to a purge-gas inlet of a use apparatus.

17. A device according to claim 9 in which the secondary module is a mixer module comprising therein a mixer gas flow path communicating with the secondary module main gas flow path and controllable valve means for adding to the gas flow through the said main gas flow path a further gas so as to supply a mixture of gases at the secondary module as delivery outlet.

18. A device according to claim 9 including at least two said secondary modules of which one secondary module is directly mounted on the primary module, and each further secondary module is directly mounted on a preceding secondary module to form a stack of secondary modules one above the other.

19. A modular gas control device for use with a cylinder of compressed gas having a main cylinder axis, said device comprising a discrete primary module adapted to be directly mountcd onto said cylinder, and a discrete secondary module directly mounted on the primary module;

the primary module comprising a body having therein:

a main gas flow path through the body, said path having a high pressure gas delivery inlet and a low pressure gas delivery outlet, a high pressure gas filling path through the body, said path having a high pressure gas filling inlet and a high pressure gas filling outlet, input connecting means for mounting and supporting the body on a cylinder of compressed gas and connecting the cylinder to the said body with both the high pressure gas delivery inlet and the high pressure gas filling outlet communicating with the gas cylinder to allow flow of gas from the cylinder into the said high pressure gas delivery inlet or flow of gas from the high pressure gas filling outlet into the cylinder, pressurc reducing means in the main gas flow path for providing at the said low pressure gas delivery outlet gas at a selected pressure substantially lower than that in the cylinder, output connecting means communicating with the said low pressure gas delivery outlet, a high pressure main gas flow path shut-off valve in the main gas flow path upstream of the pressure reducing means to selectively open and sealingly close said flow path, and a high pressure gas filling flow path valve in the high pressure gas filling flow path to open and close said flow path; and said secondary module comprising a body having therein:

a main gas flow path through the body, said path having a gas delivery inlet and a gas delivery outlet, input connecting means co-operating with the primary module output connecting means to directly mount the secondary module body on the primary module with the secondary module gas delivery inlet communicating with the primary module low pressure delivery outlet to allow flow of low pressure gas from the primary to the secondary module, output conncting mcans communicating with the said secondary module gas delivery outlet and a combination of two or more functional components for carrying out functions relating to gas flow through the secondary module;

each module having a principal axis passing through its input connecting mcans and its output connecting mcans, the main gas flow path of each module being aligned along its principal axis for at least part of the length thereof, and the principal axis of the modules when asscmbled being substantially coaxial with the main cylinder axis.

20. A device according to claim 19 including at least two said secondary modules, of which one secondary module is directly mounted on the primary module, and each further secondary module is directly mounted on a preceding secondary module to form a stack of secondary modules one above the other.

21. A device according to claim 19 in which the said at least two functional components are selected from the group consisting of means for measuring gas flow, means for varying parameters of gas flow, means for switching gas flow, means for venting gas flow, means for mixing gas flow, and means for any combination of said functions.

22. A device according to claim 19 in which the primary module high pressure filling path is discrete from the primary module main gas flow path.

23. A device according to claim 19 in which the primary module high pressure gas delivery inlet is common to the primary module high pressure gas filling outlet and the primary module main gas flow path and the primary module high pressure filling path have a common path to a location upstream of the primary module pressure reducing means.

24. A device according to claim 19 in which the high pressure gas filling valve is a shut-off valve to selectively open and sealingly close the high pressure gas filing path.

25. A device according to claim 19 in which the primary module body comprises therein a purge-gas flow path having a purge gas inlet and communicating with the primary module main gas flow path bctween the high pressurc main gas flow path shut-off valve and the pressurc reducing means for admitting purge-gas to the primary module main gas flow path and a purgc-gas valve to open and close said purge-gas flow path.

26. A set of discrete modules for providing a modular gas control device for use with a cylinder of compressed gas, the set of modules comprising a primary module adapted to be dircctly mounted onto said cylinder and a plurality of secondary modules, one of said secondary modules directly mounting on said primary module, and each additional secondary modulc directly mounting on another secondary module;

the primary module comprising a body having therein:

a main gas flow path through the body, said path having a high pressure gas delivery inlet and a low pressure gas delivery outlet, a high pressure gas filling path through the body, said path having a high pressure gas filling inlet and a high pressure gas filling outlet, input connecting means for mounting and supporting the body on a cylinder of compressed gas and connecting the cylinder to the said body with both the high pressure gas delivery inlet and the high pressure gas filling outlet communicating with the gas cylinder to allow flow of gas from the cylinder into the said high pressure gas delivery inlet or flow of gas from the high pressure gas filling outlet into the cylinder, pressure reducing means in the main gas flow path for providing at the said low pressure gas delivery outlet gas at a selected pressure substantially lower than that in the cylinder, output connecting means communicating with the said low pressure gas delivery outlet, and a high pressure gas filing flow path valve in the high pressure gas filling flow path to open and close said flow path; and each secondary module comprising a respective module body having therein:

a main gas flow path through the body, said path having a gas delivery inlet and a gas delivery outlet, output connecting means communicating with said secondary module gas delivery outlet, input connecting means cooperating with the output connecting means of a primary or secondary module to directly mount the respective secondary module body on the primary module or on another secondary module with the gas delivcry inlet of the respective secondary module communicating with the gas dclivery outlet of the primary module or the preceding secondary module, and a combination of two or more functional components for carrying out functions relating to gas flow through the secondary module.

27. A set of modules according to claim 26 in which the primary module body comprises therein a purge-gas flow path having a purge gas inlet and communicating with the primary module main gas flow path upstream of the pressure rcducing means for admitting purge-gas to the primary modulc main gas flow path and a purge-gas valve to open and close said purge-gas flow path.

28. A set of modules according to claim 26 in which in each secondary module the said at least two functional components are selected from the group consisting of means for measuring gas flow, means for varying parameters of gas flow, means for switching gas flow, means for venting gas flow, means for mixing gas flow, and means for any combination of said functions.

29. A set of modules according to claim 26 in which the primary module high pressure filling path is discrete from the primary module main gas flow path.

30. A set of modules according to claim 26 in which the primary module high pressure gas delivery inlet is common to the primary module high pressure gas filling outlet and the primary module main gas flow path and the primary module high pressure filling path have a common path to a location upstream of the primary module pressure reducing means.

31. A set of modules according to claim 26 in which the high pressure gas filling valve is a shut-off valve to selectively open and sealingly close the high pressure gas filing path.

32. A set of modulcs according to claim 26 in which at least one secondary module is a vacuum module comprising therein a vent port and switchable valve means for selectively redirecting gas flow from the respective secondary module gas dclivery inlet to vent through the vent port producing a vacuum at the respective sccondary module gas delivery outlet for evacuating apparatus connected to the respective secondary module output connecting means.

33. A set of modules according to claim 26 in which at least one secondary module output connecting means is connected to a purge-gas inlet of a use apparatus.

34. A set of modules according to claim 26 in which at least one secondary modulc is a mixer module comprising therein a mixer gas flow path communicating with the respective secondary module main gas flow path and controllable valve means for adding to the gas flow through said main gas flow path a further gas so as to supply a mixture of gases at the respective secondary module gas delivery outlet.

35. A module gas control device for use with a cylinder of compressed gas comprising a discrete primary module adapted to be directly mounted onto said cylinder, and a discrete secondary module directly mounted on the primary module;

the primary module comprising a body having therein:

a main gas flow path through the body, said path having a high pressure gas delivery inlet and a low pressure gas delivery outlet, a high pressure gas filing path through the body, said path having a high pressure gas filling inlet and a high pressure gas filling outlet, input connecting means for mounting and supporting the body on a cylinder of compressed gas and connecting the cylinder to the said body with both the high pressure gas delivery inlct and thc high pressure gas filling outlet communicating with the gas cylinder to allow flow of gas from the cylinder into the said high pressure gas delivery inlet or flow of gas from the high pressure gas filling outlet to into the cylinder, pressure reducing means in the main gas flow path for providing at the said low pressure gas delivery outlet gas at a selected pressure substantially lower than that in the cylinder, output connecting means communicating with the said low pressure gas delivery outlet, a high pressure main gas flow path shut-off valvc in the main gas flow path upstream of the pressure reducing means to selectively open and sealingly close said flow path, a high pressure gas filling flow path valve in the high pressure gas filling flow path to open and close said flow path, upstream of the pressure reducing means, a high-pressure safety relief device, or a high-pressure safety-relief region adapted to provide structure for mounting of a safety relief device, a purge-gas flow path having a purge gas inlet and communicating with the main gas flow path between the high pressure main gas flow path shut-off valve, a purge-gas valvc to open and closc said purge-gas flow path and downstream of the pressure reducing means, a low pressure indicator, or a low-pressure indicator region adapted to provide structure for a pressure indicator for indicating the pressure in the main gas flow path downstrcam of the pressure reducing mcans; and said secondary module comprising a body having therein:

a main gas flow path through the body said path having a gas delivery inlet and a gas delivery outlet, input connecting means cooperating with the primary module output connecting means to directly mount the secondary module body on the primary module with the secondary module gas delivery inlct communicating with the primary module low pressure dclivcry outlet to allow flow of low pressure gas from the primary to the secondary module, output connecting means communicating with the said secondary module low pressure gas delivery outlet, and a combination of at least two functional components for carrying out functions relating to gas flow through the secondary module.

* * * * *

UNITED STATES PATENT AND TRADEMARK OFFICE
CERTIFICATE OF CORRECTION

PATENT NO. : 6,314,986 B1
DATED : November 13, 2001
INVENTOR(S) : Dao-Hong Zheng, John Irven and Mark Allan George It is certified that error appears in the above-identified patent and that said Letters Patent is hereby corrected as shown below:

Column 28,
Line 12, "shutoff" should read -- shut-off --.
Line 24, "sclectively" should read -- selectively --.
Lines 24-25, "scalingly" should read -- sealingly --.
Line 25, "solid" should read -- said --.
Line 36, "connccting" should read -- connecting --.
Lines 46 and 60, "outlct" should read -- outlet --.
Line 51, "opcn" should read -- open --.
Line 57, "dircctly" should read -- directly --.
Line 59, "inlct" should read -- inlet --.
Line 62, "devicc" should read -- device --.
Line 63, "thercin" should read -- therein --.

Column 29,
Line 39, "dclivery" should read -- delivery --.
Line 47, "delivcry" should read -- delivery --.
Line 49, "pressurc" should read -- pressure --.
Line 57, "prcssure" should read -- pressure --.
Line 58, "rcducing" should read -- reducing --.
Line 67, "thc" should read -- the --.

Column 30,
Line 6, "dclivery" should read -- delivery --.
Line 7, "lest" should read -- least --.
Line 47, "as" should read -- gas --.
Line 57, "mountcd" should read -- mounted --.

Column 31,
Line 8, "pressurc" should read -- pressure --.
Line 30, "connccting mcans" should read -- connecting means --.
Lines 36 and 37, "mcans" should read -- means --.
Line 40, "asscmbled" should read -- assembled --.

Column 32,
Line 2, "bctween" should read -- between --.
Lines 2 and 3, "pressurc" should read -- pressure --.
Line 6, "purgc" should read -- purge --.
Line 11, "dircctly" should read -- directly --.
Line 14, "modulc" should read -- module --.
Line 47, "cooperating" should read -- co-operating --.
Line 51, "delivcry" should read -- delivery --.

UNITED STATES PATENT AND TRADEMARK OFFICE
CERTIFICATE OF CORRECTION

PATENT NO. : 6,314,986 B1
DATED : November 13, 2001
INVENTOR(S) : Dao-Hong Zheng, John Irven and Mark Allan George It is certified that error appears in the above-identified patent and that said Letters Patent is hereby corrected as shown below:

<u>Column 32,</u>
Line 53, "dclivery" should read -- delivery --.
Line 62, "rcducing" should read -- reducing --.
Line 63, "modulc" should read -- module --.

<u>Column 33,</u>
Line 19, "modulcs" should read -- modules --.
Line 23, "dclivery" should read -- delivery --.
Line 24, "sccondary" should read -- secondary --.
Line 31, "modulc" should read -- module --.
Line 38, "module" should read -- modular --.

<u>Column 34,</u>
Line 1, "inlct" should read -- inlet --.
Line 1, "thc" should read -- the --.
Lines 14 and 28, "valvc" should read -- valve --.
Line 28, "closc" should read -- close --.
Line 34, "downstrcam" should read -- downstream --.
Line 34, "mcans" should read -- means --.
Line 38, "cooperating" should read -- co-operating --.
Line 41, "inlct" should read -- inlet --.
Line 43, "dclivcry" should read -- delivery --.

Signed and Sealed this

Nineteenth Day of March, 2002

*Attest:*

JAMES E. ROGAN

*Attesting Officer*

*Director of the United States Patent and Trademark Office*